Figure 1:
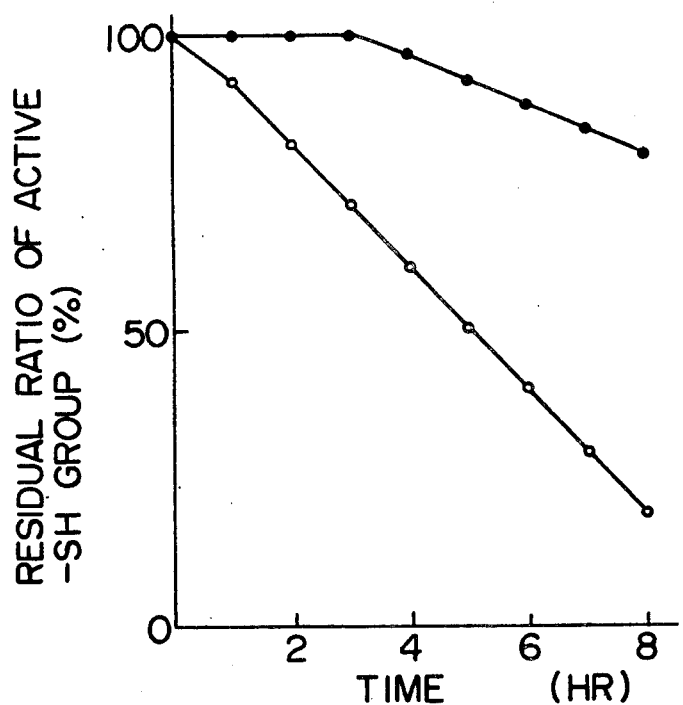

United States Patent [19]

Mizutani

[11] 4,009,264
[45] Feb. 22, 1977

[54] COMPLEXES OF POLYSACCHARIDES OR DERIVATIVES THEREOF WITH REDUCED GLUTATHIONE AND PROCESS FOR PREPARING SAID COMPLEXES

[75] Inventor: Akihiro Mizutani, Tenjin, Japan

[73] Assignee: Meito Sangyo Kabushiki Kaisha, Japan

[22] Filed: Apr. 1, 1975

[21] Appl. No.: 564,212

[30] Foreign Application Priority Data

Mar. 3, 1975 Japan .................. 50-24969
Mar. 3, 1975 Japan .................. 50-24970

[52] U.S. Cl. .................. 424/177; 260/112.5 R
[51] Int. Cl.$^2$ .............. A61K 37/00; C07C 103/52
[58] Field of Search ............ 260/112.5 R; 424/177

[56] References Cited

UNITED STATES PATENTS

| 3,619,371 | 11/1971 | Crook et al. ........... 260/112.5 R |
| 3,645,852 | 2/1972 | Axen et al. ............ 260/112.5 R |
| 3,679,653 | 7/1972 | Schuck et al. .......... 260/112.5 R |
| 3,788,948 | 1/1974 | Kagedal et al. ........ 260/112.7 |
| 3,882,097 | 5/1975 | Pfister et al. .......... 260/112.5 R |

FOREIGN PATENTS OR APPLICATIONS 1,223,281  2/1971  United Kingdom

OTHER PUBLICATIONS

Kagedal et al.: Acta Chem. Scan., 25, 1855–1859 (1971).
Dan: Chem. Abst. 68:20005n (1968).

Primary Examiner—Lewis Gotts
Assistant Examiner—Reginald J. Suyat
Attorney, Agent, or Firm—Wenderoth, Lind & Ponack

[57] ABSTRACT

A complex of a polysaccharide or its derivative with reduced glutathione having in its infrared absorption spectrum no absorption peak at about 2500 cm$^{-1}$ which appears in the infrared absorption spectrum of the reduced glutathione. The complex is prepared by reacting the polysaccharide or its derivative activated with an activating agent selected from cyanogen halides, organic cyanic acid esters and alkyl esters of halogenocarbonic acids, with the reduced glutathione at a pH of less than 7. The complex is especially useful for stabilizing thiol groups.

4 Claims, 20 Drawing Figures

COMPLEXES OF POLYSACCHARIDES OR DERIVATIVES THEREOF WITH REDUCED GLUTATHIONE AND PROCESS FOR PREPARING SAID COMPLEXES

This invention relates to complexes of polysaccharides or their derivatives with reduced glutathione which exhibit a marked improvement in the stability of reduced glutathione to auto-oxidation, and an increase in the ability of the reduced glutathione to form mercapturic acid and/or mercaptide; a process for preparing these complexes; and also to the use of these complexes.

The complexes of this invention are clearly distinguished from reduced glutathione and mere mixtures of reduced glutathione and polysaccharides or their derivatives in that these complexes have not been described in the literature, and a clear absorption peak at about 2500 cm$^{-1}$ appearing in the infrared absorption spectrum of the reduced glutathione is no longer present.

These complexes of this invention have a wide range of utility in such applications as medicines, thiol group-stabilizing agents for protecting other thiol-containing compounds from auto-oxidation, treating agents for waste waters containing heavy metals and/or aromatic halogen compounds, and agents for capturing and recovering heavy metals.

Glutathione occurs in great quantities in a wide variety of animals, plants and microorganisms, and is a physiologically important substance as it has an action based on the oxidation-reduction reaction of thiol groups, acts as if it were a co-enzyme, and also participates in a detoxicating mechanism as a result of forming mercapturic acid or mercaptide.

We have extensively worked on the improvement of the biochemical properties of reduced glutathione, especially on the improvement of the stability of its thiol groups to auto-oxidation and the improvement of its ability to form mercapturic acid and/or mercaptide. As a result, we found that complexes can be formed by reacting the reduced glutathione with polysaccharides or their derivatives, and that the resulting complexes exhibit a marked improvement in the stability of the reduced glutathione to auto-oxidation and an increase in the ability to form mercapturic acid and/or mercaptide.

British Pat. No. 1,223,281 published on Feb. 24, 1971 discloses complexes formed between sensitive biopolymers containing one or more primary or secondary amino groups, such as proteins and peptides, and polymers containing one or more hydroxyl groups or primary or secondary amino groups, such as polysaccharides and their derivatives. The patent describes enzymes, antibodies, proteins and/or peptide hormones, antigenic proteins, aminopolysaccharides and nuclei acids as examples of the biopolymers, and the working Examples show chymotrypsin, insulin, gamma-globulin, oxytocin, and glucose oxidase. The patent, however, does not describe the use of reduced glutathione.

Furthermore, the British Patent disclosed that by reacting under alkaline conditions the biopolymers and activated poylmers obtained by treating the biopolymers with a cyanogen halide, they can be combined without breaking up the peptide bindings of the biopolymers, and therefore, it is possible, for example, to bind enzymes to polymers without any essential losses in enzyme activity and to bind an antibody to the polymer, without the ability of the antibody of binding its antigen being lost. In other words, this patent states that by forming the above complexes, the biopolymers can be chemically bound to polysaccharides or their derivatives without any substantial losses in the activity or ability of the biopolymers.

The British Patent only discloses that the chemical binding can be performed without any substantial losses in the activity or ability of the biopolymers, and does not disclose nor suggest the possibility of improving or increasing such activity or ability, and quite lacks the technical concept of achieving such improvement.

Japanese Patent Publication No. 28031/74 discloses a process for preparing complexes which comprises reacting polymers containing groups of the molecular formula —XH (wherein —XH represents a hydroxyl group or a primary or secondary amino group), such as a copolymer or dextran and epichlorohydrin, with compounds containing one or more cyanate groups, and then reacting the resulting active derivatives of the polymers with organic compounds containing groups of the molecular formula —YH (wherein —YH represents a primary or secondary amino group) to bond them covalently.

This Japanese patent discloses proteins, polypeptides, peptides and amino acids and their derivatives, enzymes, antibodies, protein and/or peptide hormones, antigen proteins, allergens, haptens, and polysaccharides containing amino groups —YH as examples of the organic compounds containing groups —YH. Specifically, the patent discloses insulin autibody, cysteine, glycylleucine, and glycyl thyrocine.

This patent neither discloses reduced glutathione as the biopolymer. The patent merely states that the biopolymers, for example, an antibody can be chemically bound to polymers, for example, crosslinked dextran without losses in the properties of an antibody. There is no disclosure and suggestion as to the possibility and technical concept of improving and increasing the activity or ability of the antibody.

Acta. Chem. Scand., 25, pages 1855–1859, 1971 discloses the preparation of complexes similar to those described in the above British Patent by reacting activated dextran treated with a cyanogen halide or an organic cyanic acid ester under alkaline conditions. This reference reports that in a complex of dextran and insulin, the activity of the free insulin is substantially reduced to 1/36, and a complex of dextran and ampicillin has activity although it is weaker than that of the ampicillin.

In view of the conventional knowledge that at best, the activity or ability of the biopolymers is substantially not lost, and frequently, it is substantially reduced, we have surprisingly found that reduced glutathion not specifically described in these prior art references forms complexes with polysaccharides or their derivatives, and that these complexes exhibit a marked improvement or increase in the activity or ability possessed by the reduced glutathione. It has been unexpectedly found that in the complexes of the present invention, the stability of the thiol group (—SH) of reduced glutathione to auto-oxidation is markedly improved, and the ability of the reduced glutathione to form mercapturic acid and/or mercaptide increases.

It has further been found that alkyl esters of halogenocarbonic acids as well as cyanogen halides and organic cyanic acid esters can be used as activating agents for obtaining the above complexes, and the reaction for forming complexes is preferably carried out under acidic conditions with a pH of less than 7.

Accordingly, it is an object of this invention to provide complexes of polysaccharides or their derivatives with reduced glutathione.

Another object of this invention is to provide a process for preparing these complexes with commercial advantages.

Still another object of this invention is to provide the use of these complexes.

Many other objects and advantages of this invention will become apparent from the following description.

In the infrared absorption spectrum of the complex of this invention, a clear absorption peak at about 2500 cm$^{-1}$ seen in the spectrum of the starting reduced glutathione is no longer present. In this respect, the complexes of this invention can be clearly distinguished from any of the reduced glutathione, activated polysaccharides or their derivatives and mere mixtures of the reduced glutathione and polysaccharides or their derivatives.

When the complex of this invention is incubated in a sodium phosphate buffer (0.1M, pH 8.0) in the presence of $FeCL_3$ (1.2 × 10$^{-5}$ M) at a temperature of 40° C. for 6 hours, the residual ratio of the active SH group is at least 50%. In this regard, too, the complexes of this invention can be clearly distinguishd from any of the reduced glutathione, activated polysaccharides or their derivatives, and mere mixtures of the reduced glutathione and polysaccharides or their derivatives.

Figure 6:
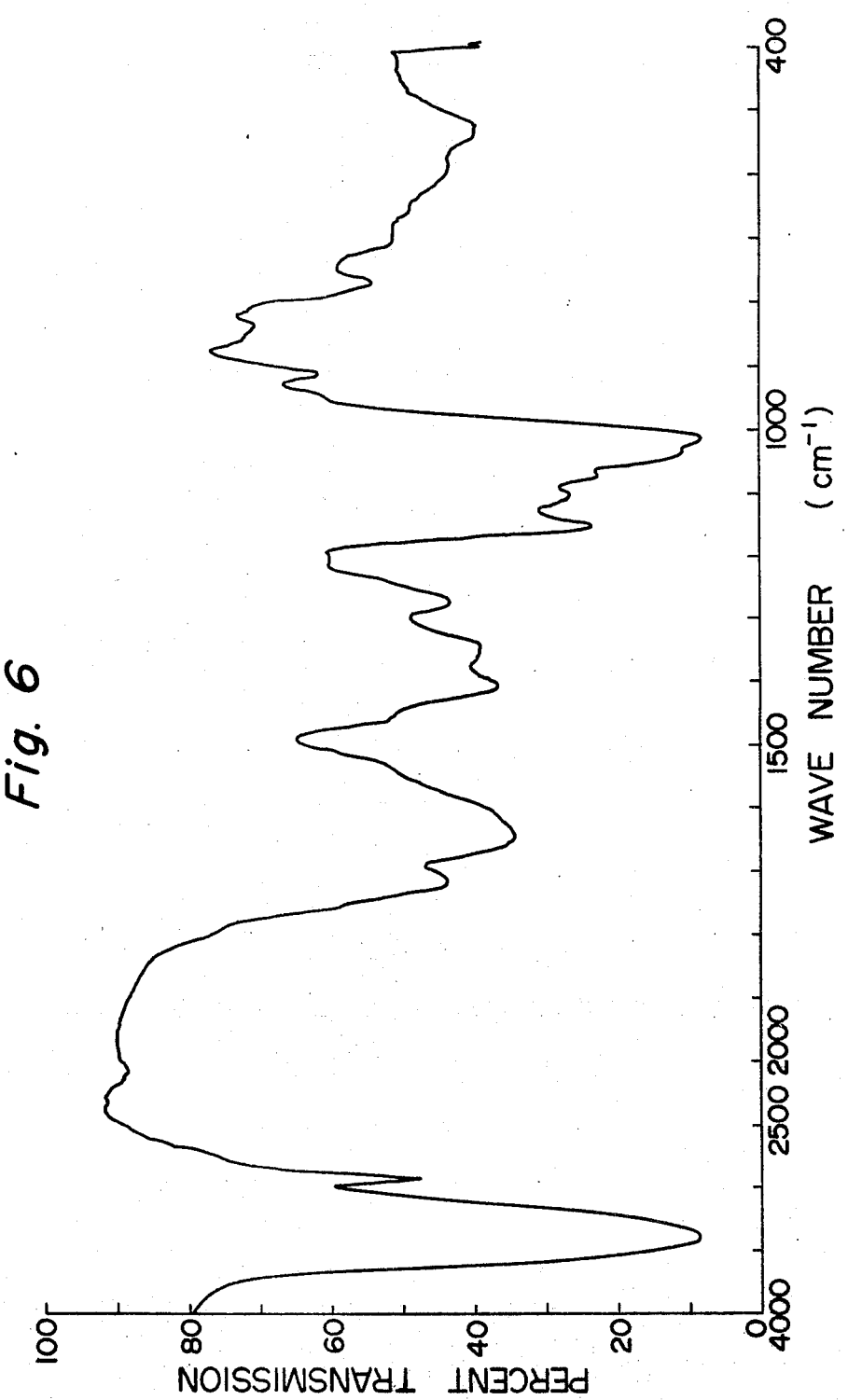
Figure 7:
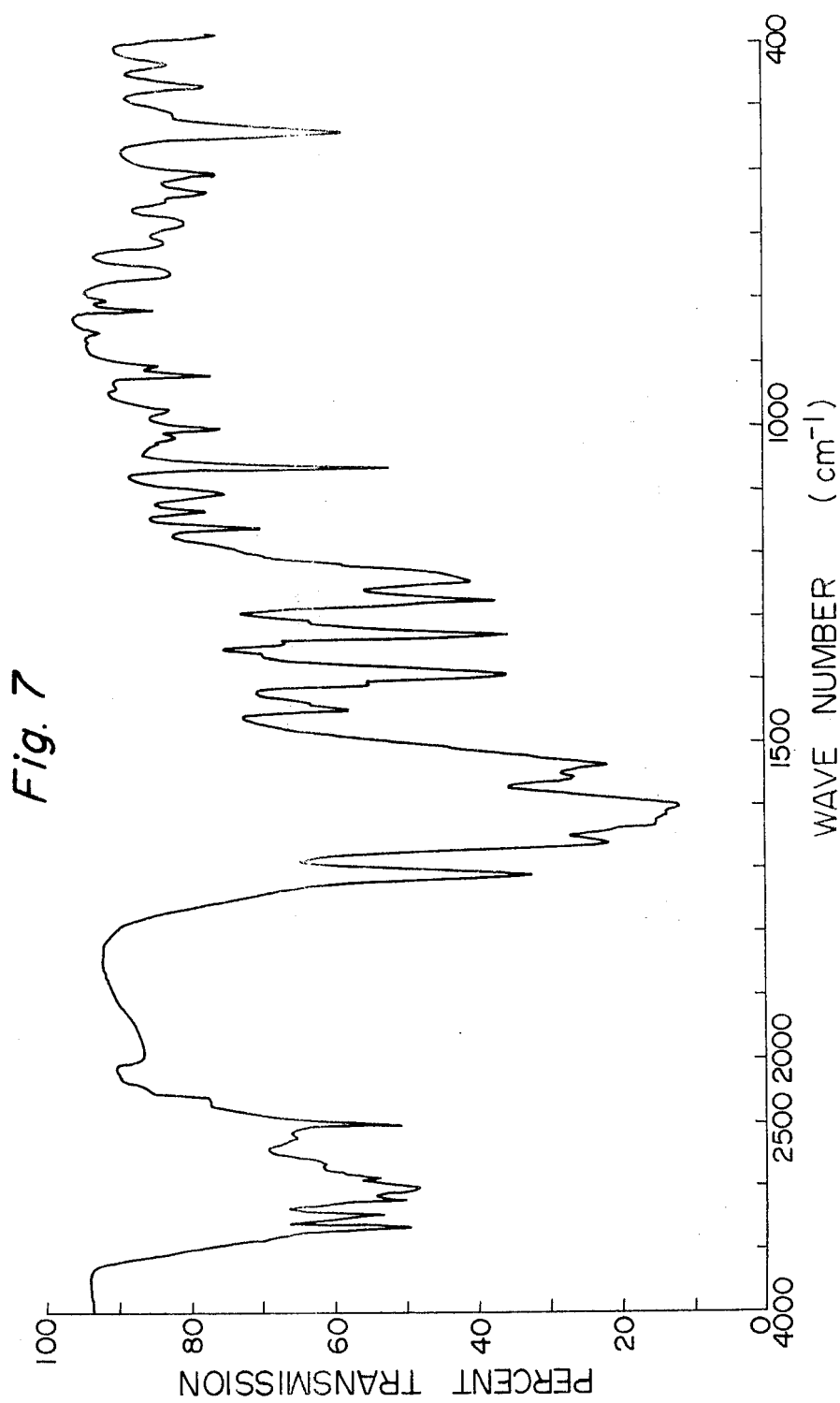
Figure 8:
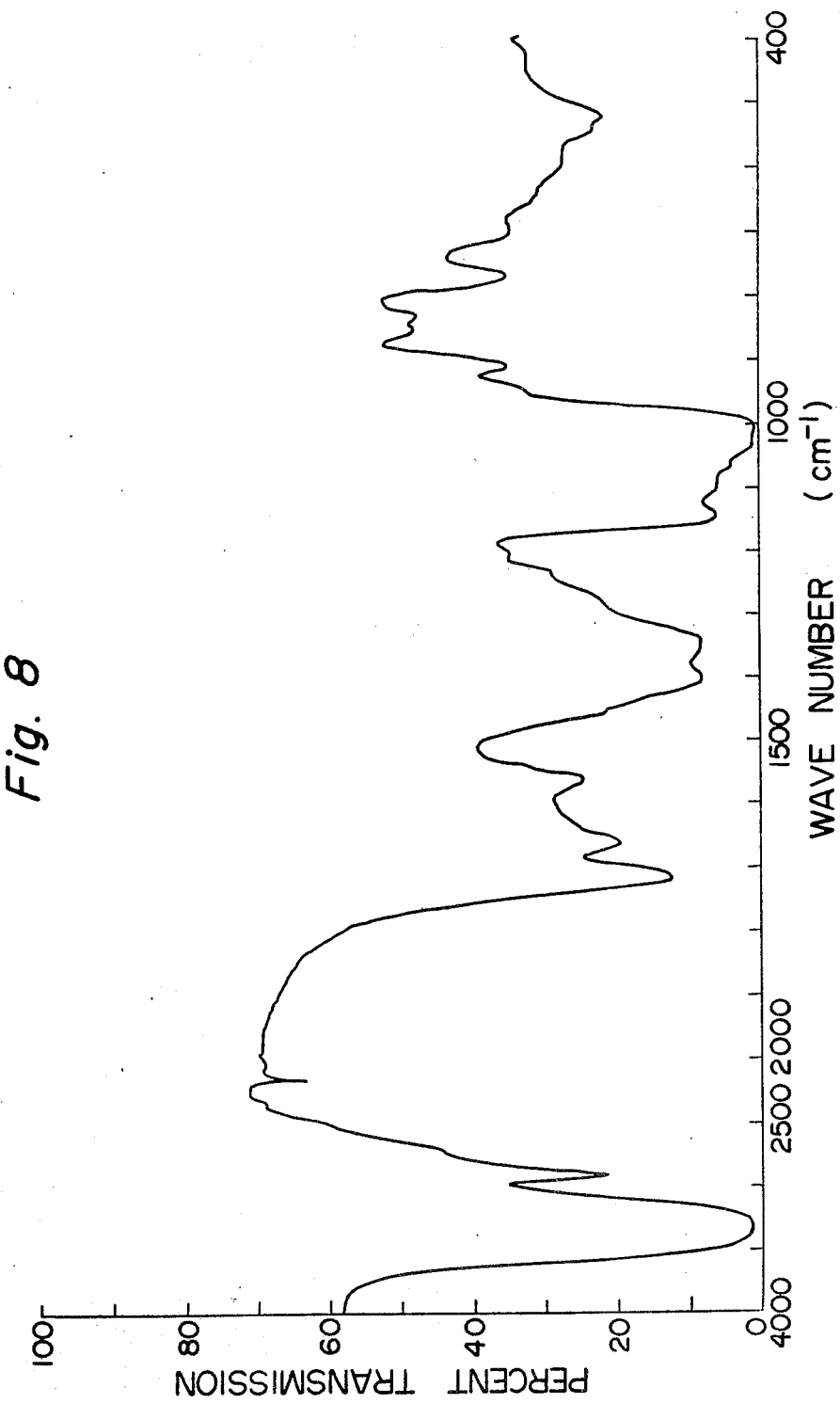
Figure 9:
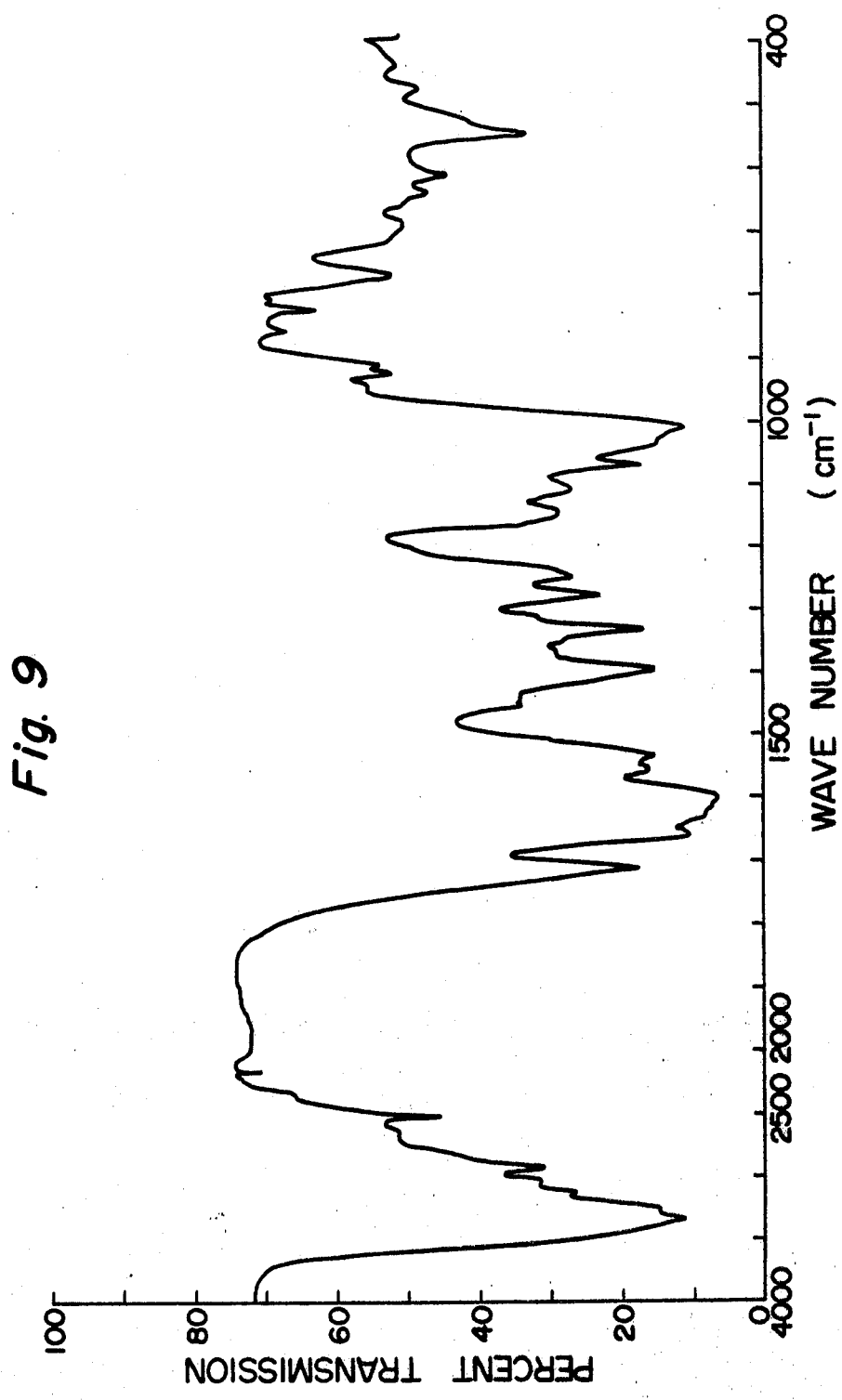

FIG. 6 of the accompanying drawings shows the infrared absorption spectrum of the complex of reduced glutathione with dextran obtained in Example 1. FIG. 7 shows the infrared absorption spectrum of the reduced glutathione used for forming the above complex. FIG. 8 shows the infrared absorption spectrum of the activated dextran used in the formation of the above complex. FIG. 9 shows the infrared absorption spectrum of a mere mixture of the above reduced glutathione and the activated dextran.

As is clear from FIGS. 6 to 9, in the complex of this invention, a clear absorption peak (shown by an arrow in FIG. 7) in the vicinity of 2500 cm$^{-1}$ of the reduced glutathione completely disappears. This absorption peak is clearly present in the case of the mere mixture of the reduced glutathione and the activated dextran. As is clear from a comparison of FIG. 8 with FIG. 6, the complex of this invention shows an infrared absorption spectrum clearly distinguished from that of the activated dextran. In the infrared absorption spectrum of the complex of this invention in FIG. 6, an absorption ascribable to an α-1:6 glucocide linkage is observed at about 760 cm$^{-1}$ and 910 cm$^{-1}$. In the vicinity of 3400 cm$^{-1}$, a broad absorption based on —OH is seen. This shows that the complex is a derivative of dextran. On the other hand, the clear absorption peak at about 2500 cm$^{-1}$ based on the reduced glutathione has disappeared.

Figure 10:
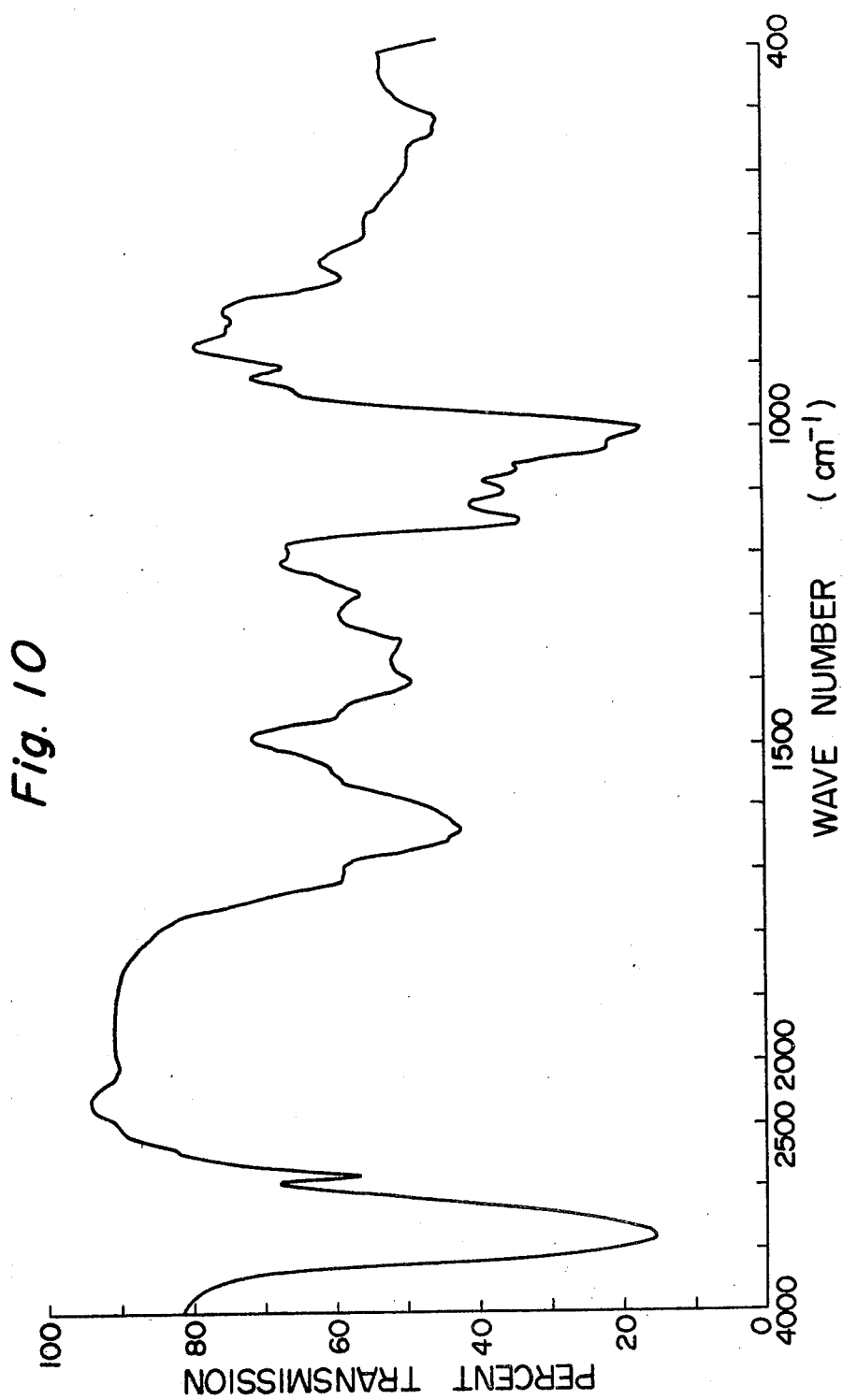
Figure 11:
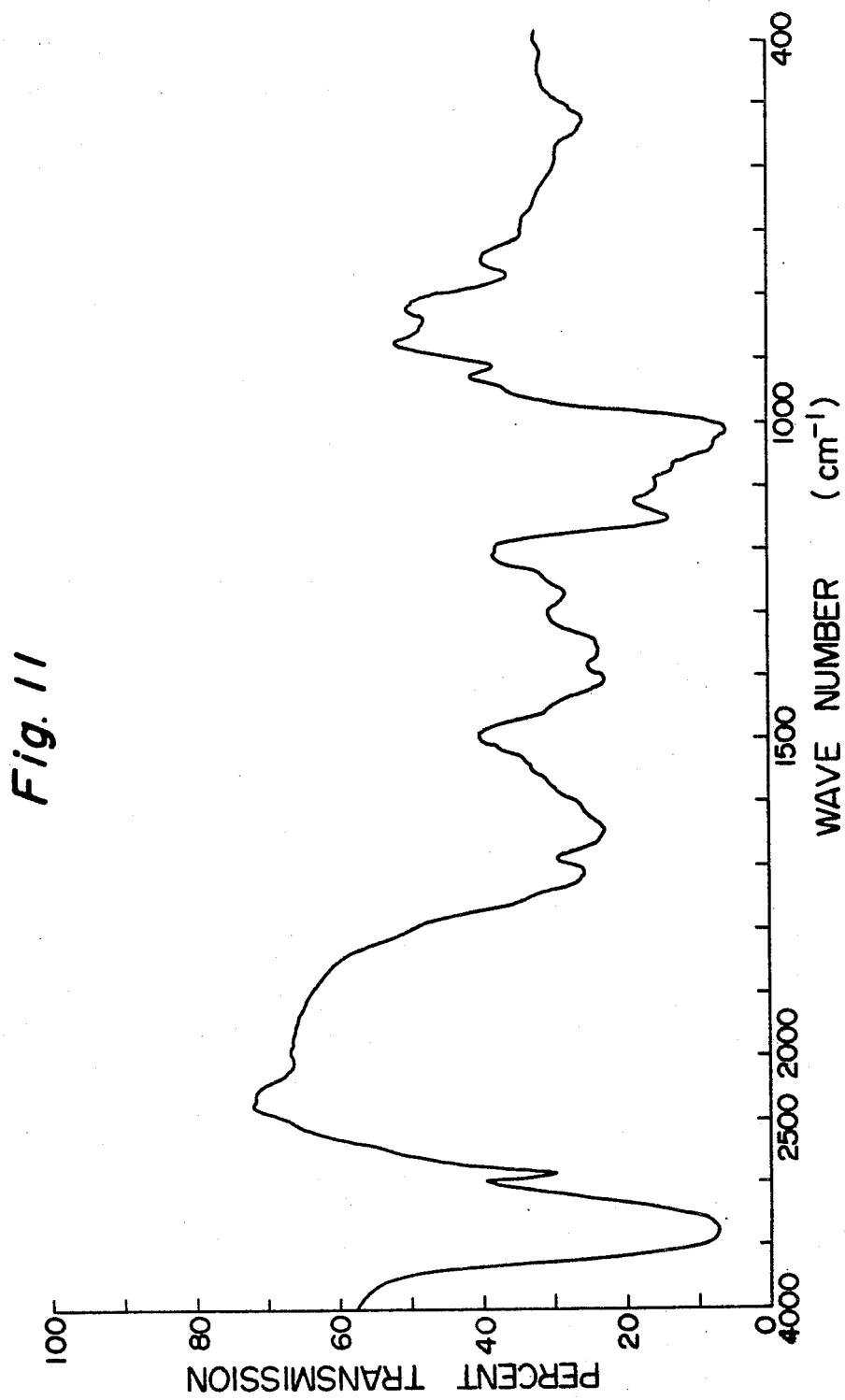
Figure 12:
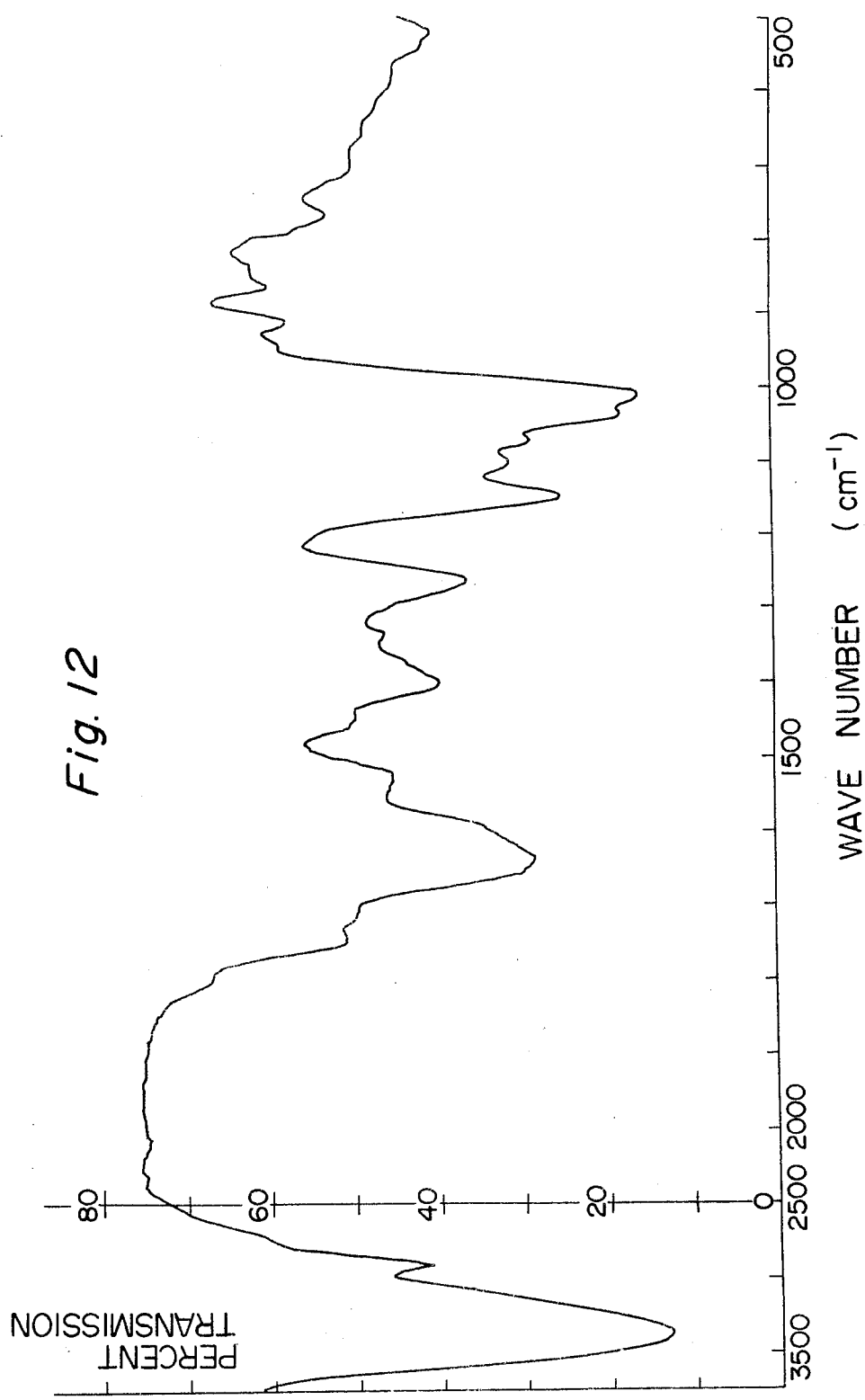
Figure 13:
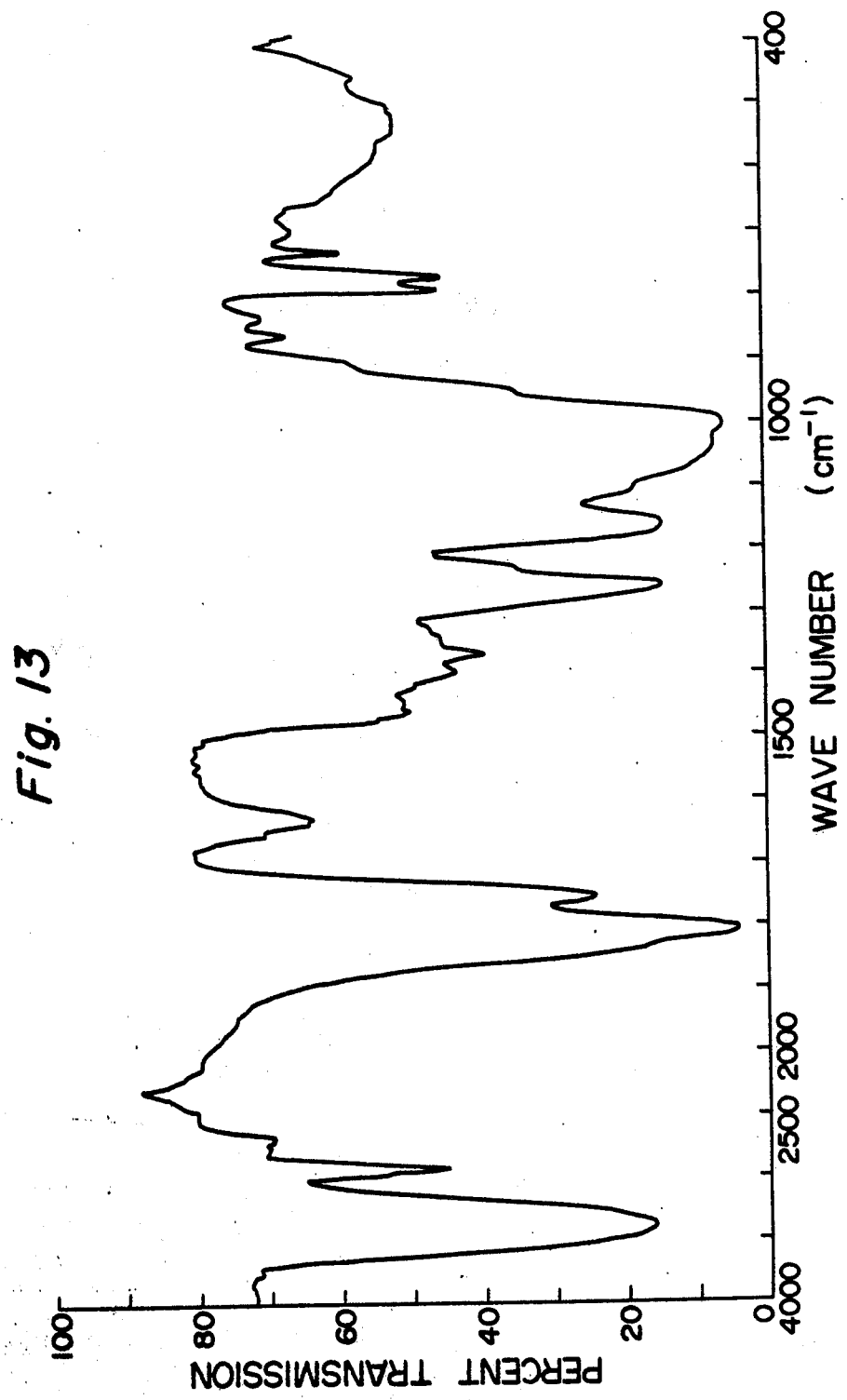
Figure 14:
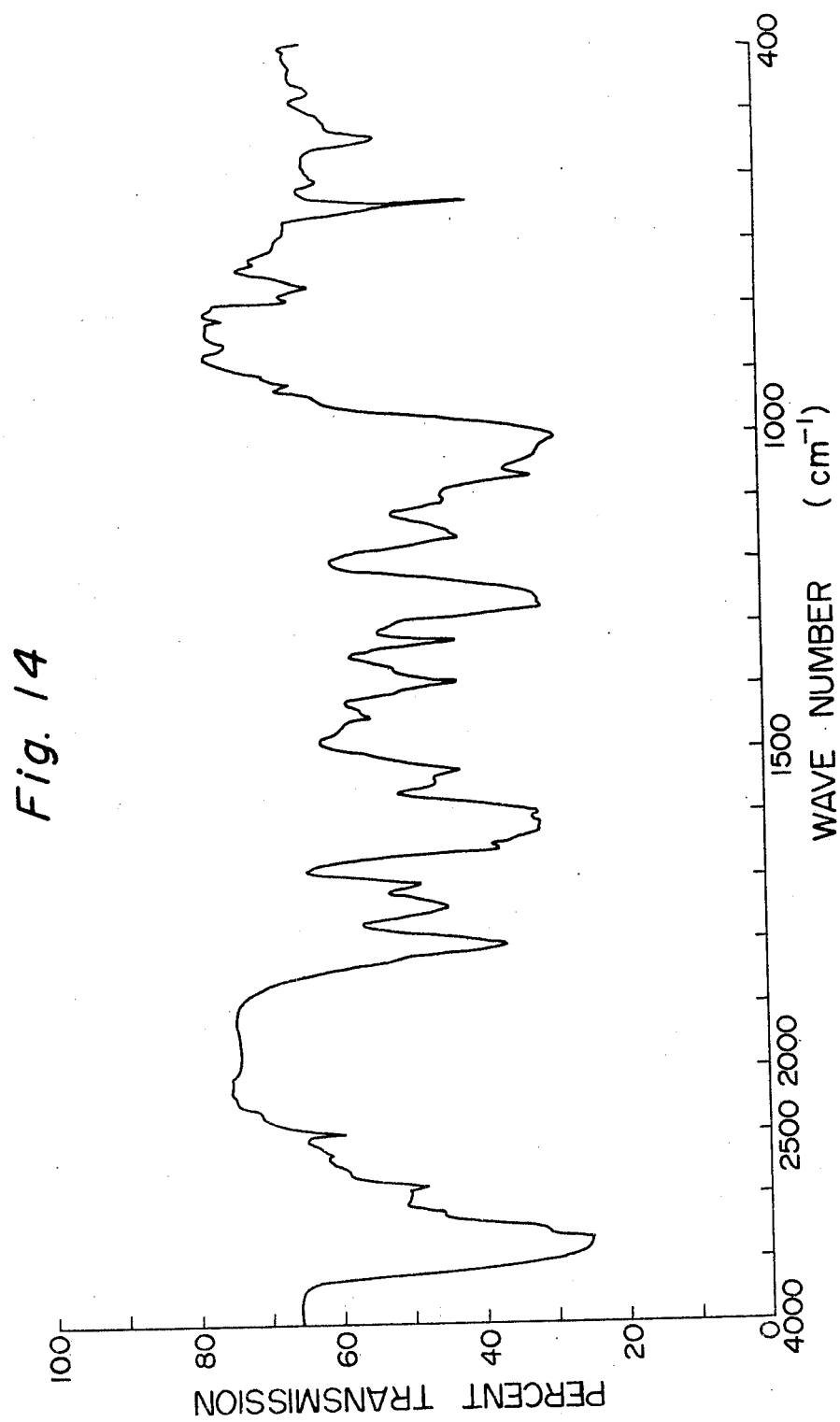
Figure 15:
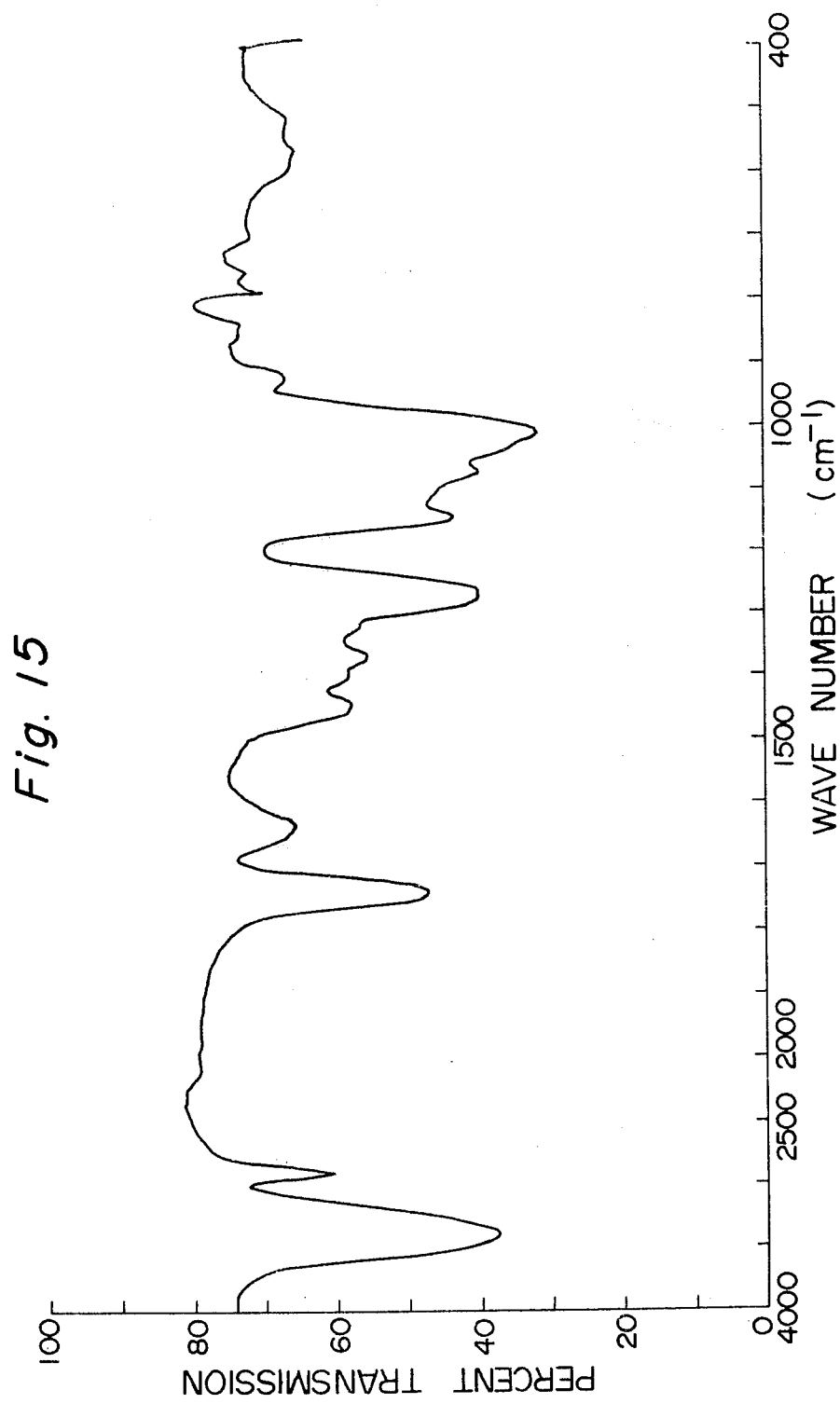
Figure 16:
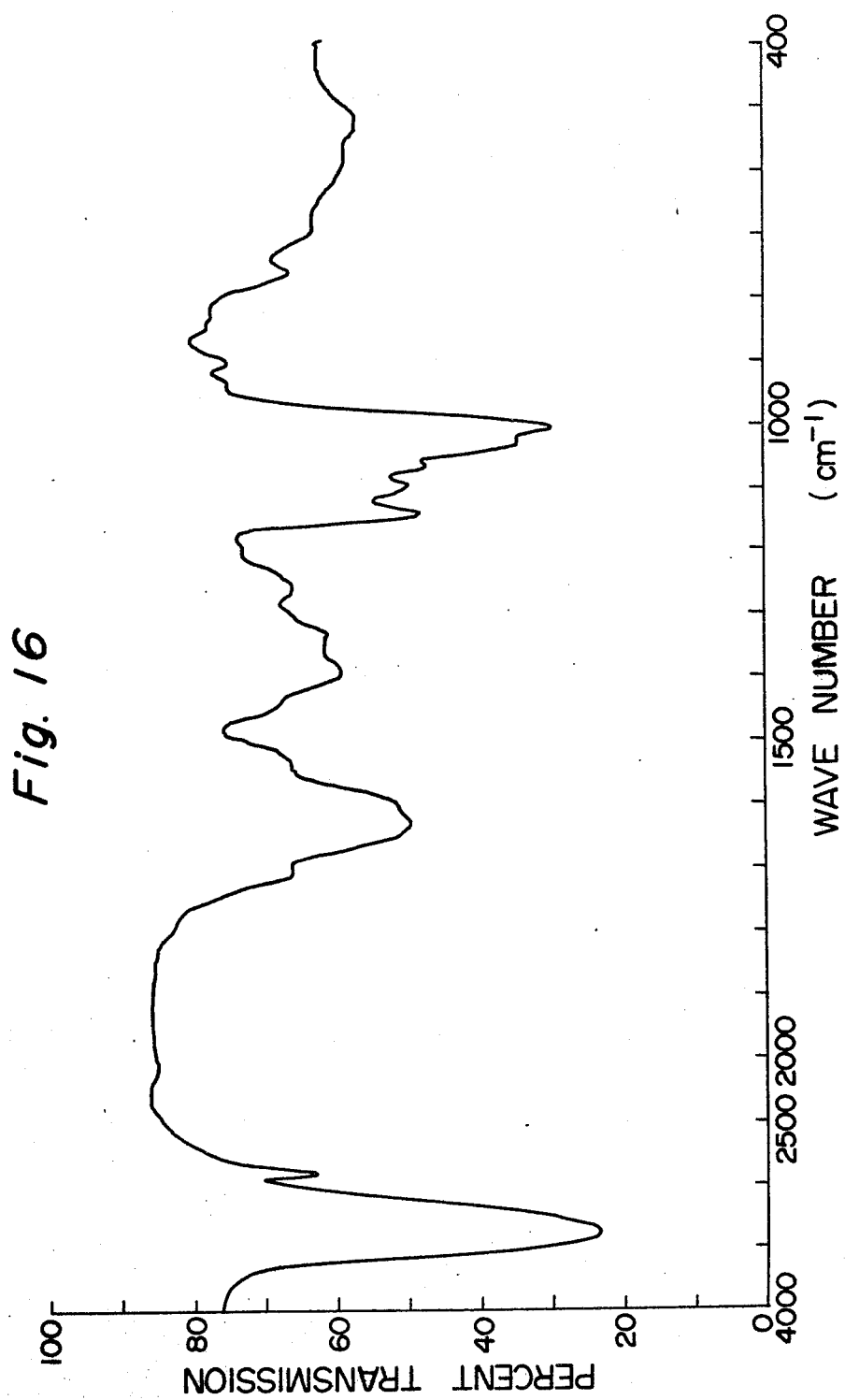
Figure 17:
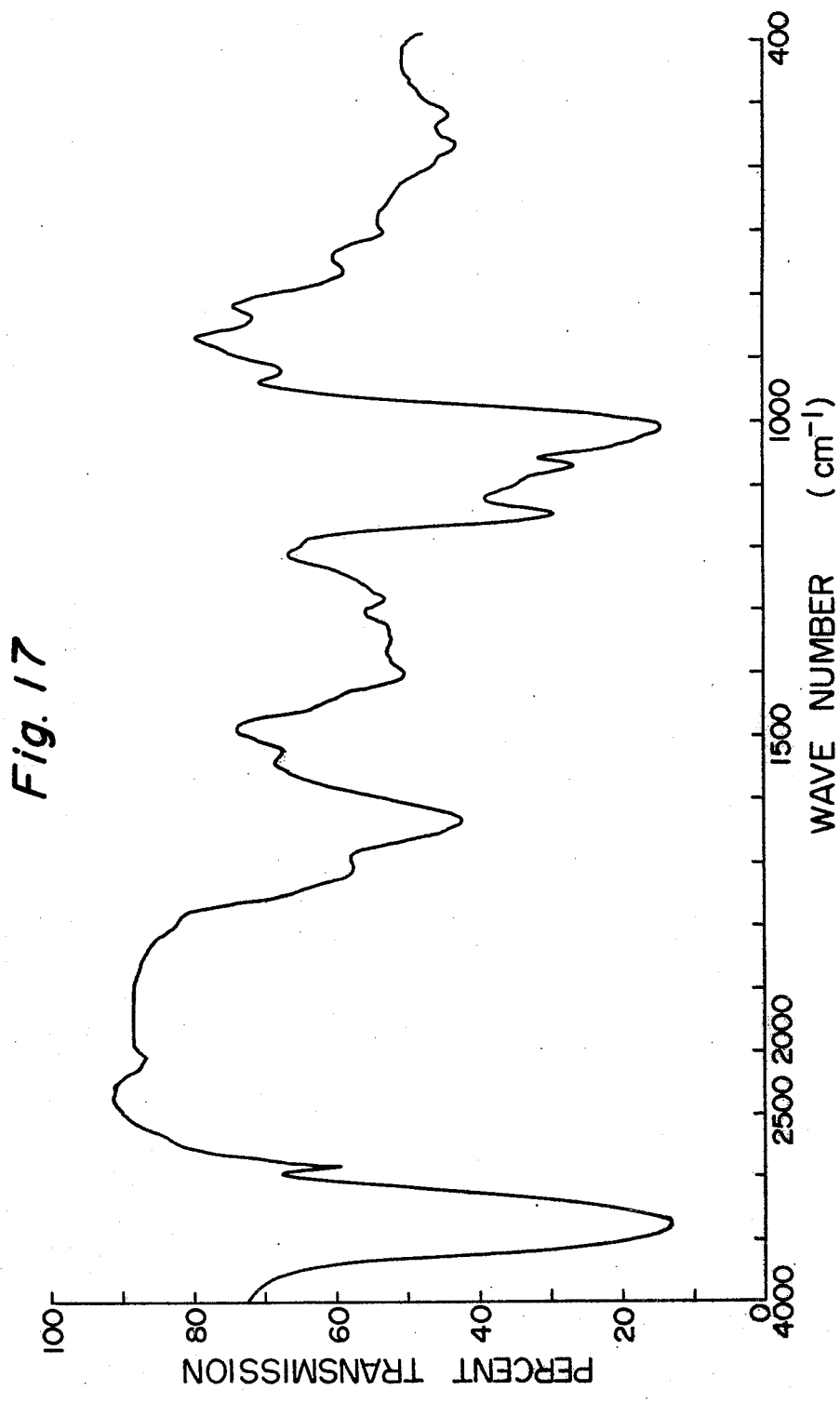
Figure 18:
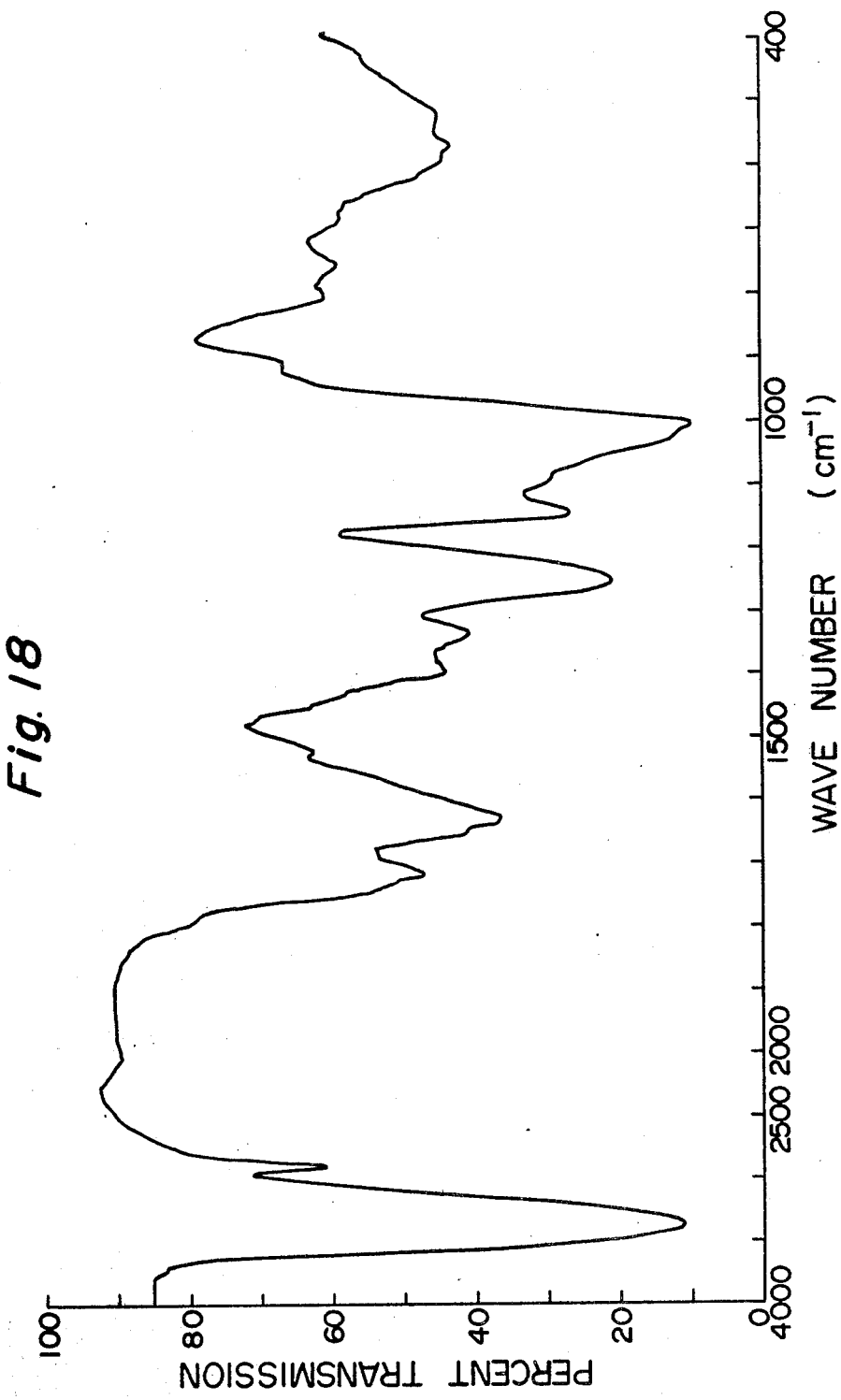
Figure 19:
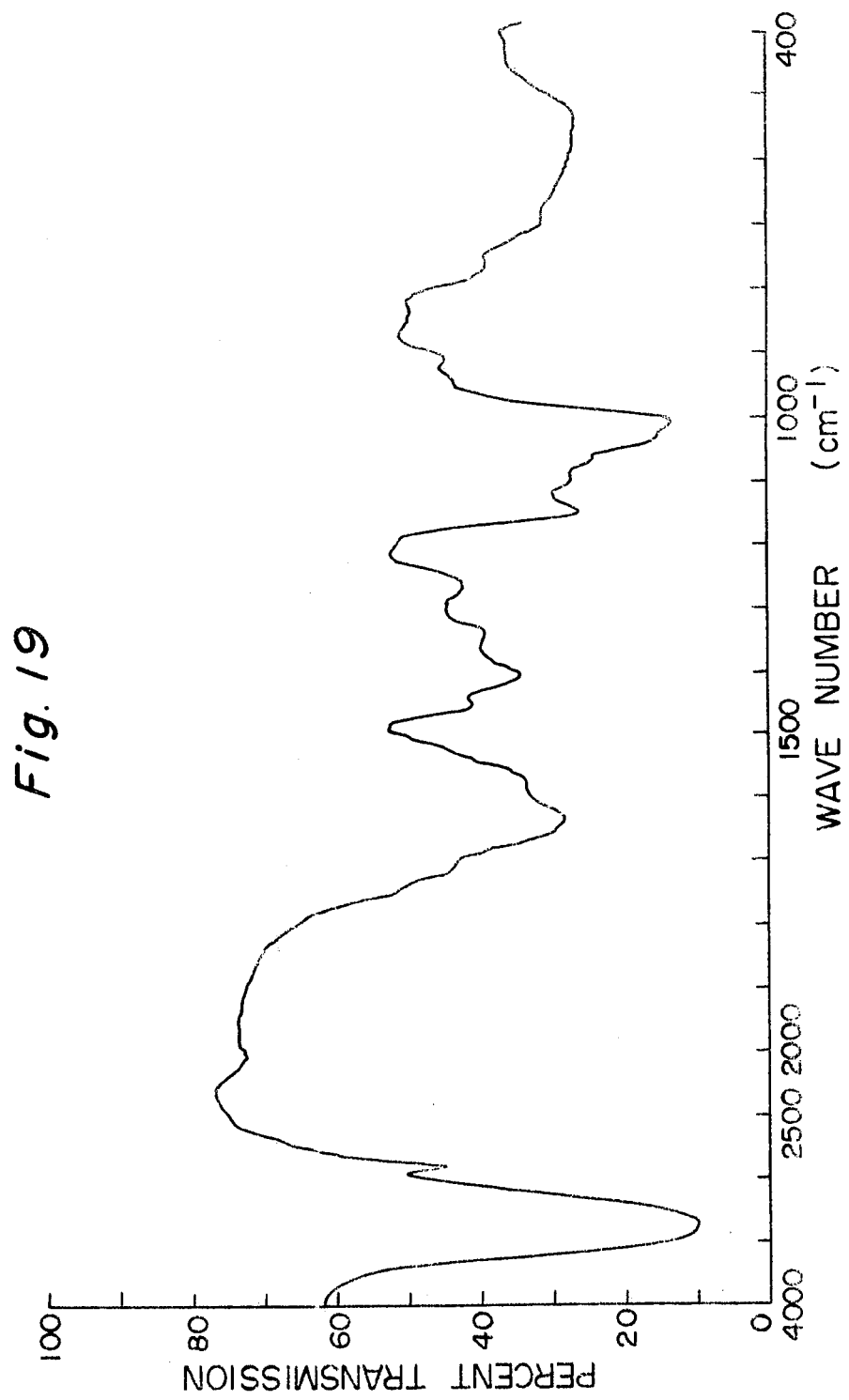
Figure 20:
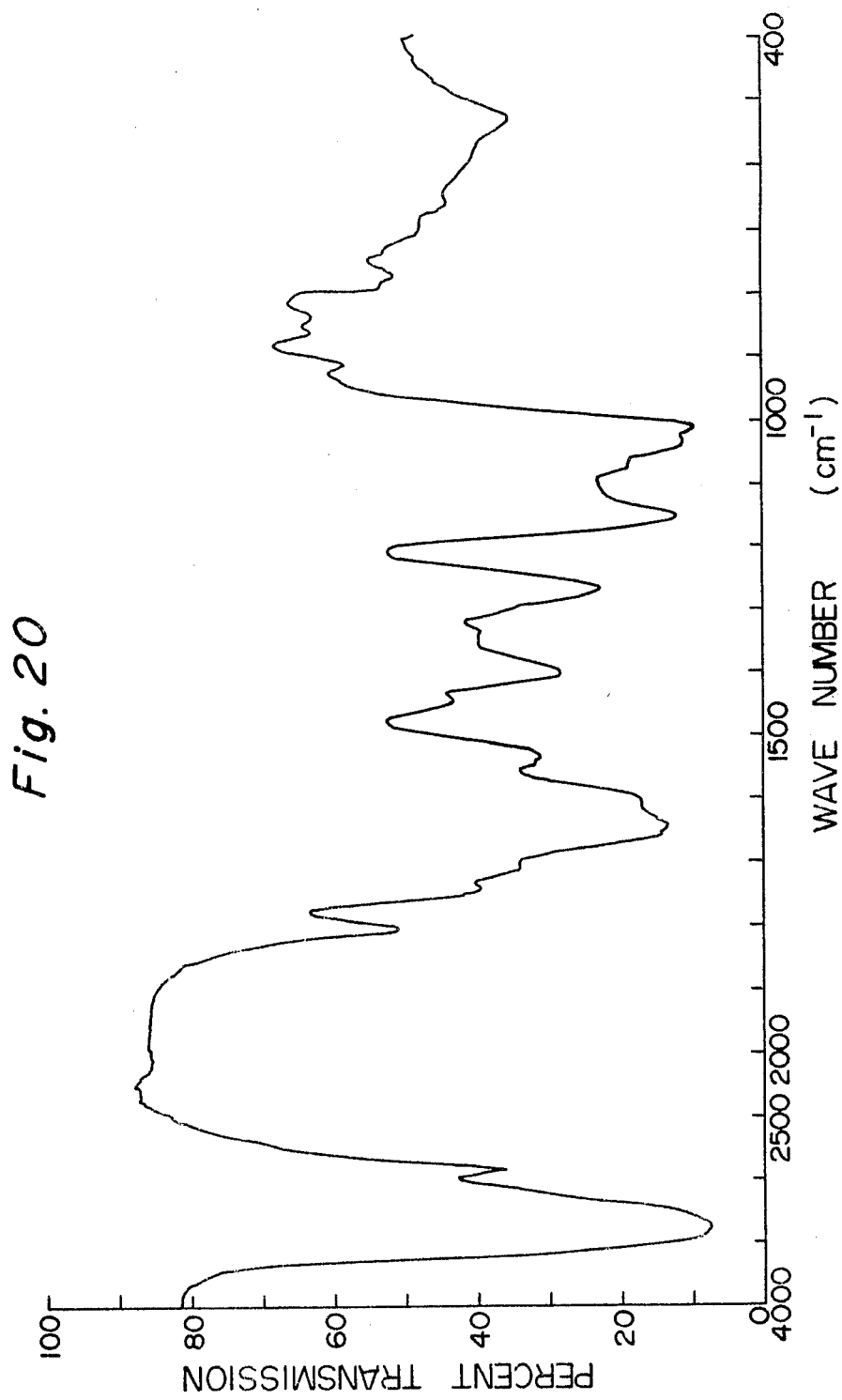

FIG. 10 shows the infrared absorption spectrum of the complex of this invention obtained in Example 2; FIG. 11, that of the complex obtained in Example 3; FIG. 12, that of the complex obtained in Example 5; FIG. 13, that of the activated dextran used in Example 5; FIG. 14, that of a mere mixture of the activated dextran and reduced glutathione. Furthermore, FIGS. 15, 16, 17, 18, 19 and 20 show infrared absorption spectra of the complexes obtained in Examples 6, 7, 8, 9, 10 and 11 respectively. In these infrared absorption spectrum charts, too, the clear absorption peak at about 2500 cm$^{-1}$ of the starting reduced glutathione has completely disappeared.

From the charts of FIGS. 6, 8, 12 and 14, it can be seen that for example, an absorption at about 1715 cm$^{-1}$ ascribable to —CONH— of dextran activated with cyanogen bromide, and an absorption at about 1800 cm$^{-1}$ ascribable to the carbonate group of dextran activated with ethyl chlorocarbonate are reduced in the infrared absorption spectrum of the complex of each of them with reduced glutathione.

Analysis of amino acids of the complexes of this invention indicates that the ratio of glutamic acid/cysteine/glycine is about 1/1/1, and thus it is confirmed that glutathione is present in the complexes of this invention.

The chemical structure of the complexes of this invention is still in the domain of conjecture. In view, however, of the fact that the structure of the activated dextran used, for example, in Example 1 has already been presumed to be of the following formulae 1 and 2, and in view of the reactivity of sugar imido carbonate or sugar carbonate, the chemical structure of the complexes of this invention is presumed to be of the following formulae 3 to 5 (expressed with respect to the anhydro glucose unit of the dextran).

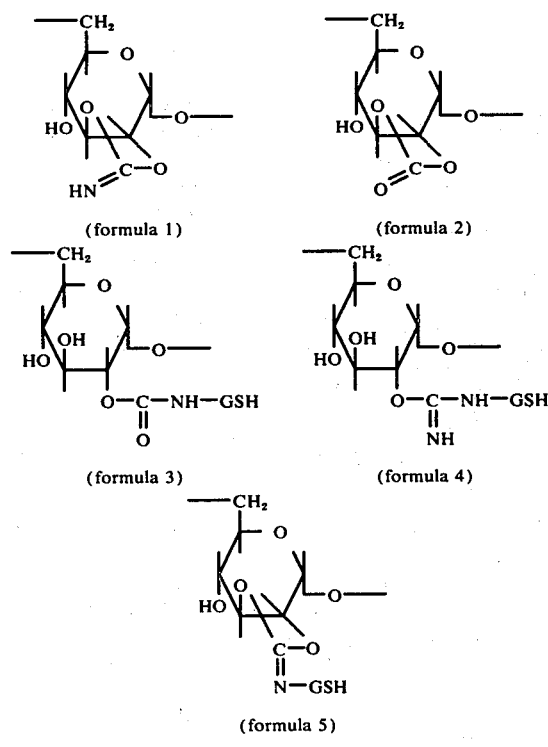

($H_2N$—GSH represents reduced glutathione)

Complexes of reduced glutathione with other polysaccharides or their derivatives are also presumed to have similar structures.

In the complexes of polysaccharides or their derivatives with reduced glutathione in accordance with this invention, the stability of the thiol group (—SH) of the reduced glutathione to auto-oxidation has been markedly improved. In this regard, too, the complexes of this invention can be clearly distinguished from the reduced glutathione and mere mixtures of polysaccharides or their derivatives and reduced glutathione. When the complex of this invention is incubated in a sodium phosphate buffer (0.1 M, pH 8.0) in the presence of $FECL_3$ ($1.2 \times 10^{-5}$ M) at 40° C. for 6 hours, the residual ratio of the active SH group is at least 50%, in many cases at least about 60%, frequently at least about 70%, and in some cases as high as more than 90%.

The sodium phosphate buffer, as referred to in this application, is a solution of 0.827 g of $NaH_2PO_4 \cdot 2H_2O$ and 33.916 g of $Na_2HPO_4 \cdot 12H_2$ in distilled water to make the entire volume 1 liter.

The residual ratio of the active SH group, or simply called the residual activity, as used in this application is determined as follows:

The complex of this invention and other SH-containing compounds are incubated at a certain termperature in a sodium phosphate buffer (0.1 M, pH 8.0). Aliquotes are withdrawn at intervals and immediately the active SH group contents of the samples are determined. The maximum content obtained is made 100 (%), and the active SH group content of each of the samples is expressed in percentage based on this maximum content.

FIG. 1 of the accompanying drawings is a graphic representation showing the rate of auto-oxidation of the complex of reduced glutathione and dextran obtained in Example 1 and the rate of auto-oxidation of the starting reduced glutathione.

In FIG. 1, the axis of abscissa shows the incubating time in hours, and the axis of ordinates, the residual ratio of the active SH group. It is clear from a comparison of the residual ratio of the complex of this invention shown by -●-●- and that of the reduced glutathione shown by -O-O- that in the complex of this invention, the poor stability of the reduced glutathione to auto-oxidation has been markedly improved. In this example, the active SH residual ratio (40° C., 6 hours) of the complex of this invention is about 87%. On theother hand, in the reduced glutathione, the residual ratio is about 40% which is a decrease to less than one-half of that of the complex. Furthermore, after a lapse of 8 hours, the residual ratio of the complex of this invention is still maintained as high as about 80%, whereas in the case of the reduced glutathione, the residual ratio is reduced down to about 20%. The same result as in the case of the reduced glutathione is obtained with a mere mixture of the reduced glutathione and activated dextran, although this is not shown in the drawings.

In addition to having a markedly increased stability to auto-oxidation, the complex of a polysaccharide or a derivative thereof with reduced glutathione of this invention has superior protective or stabilizing action against the auto-oxidation of other SH-containing compounds.

Figure 3:
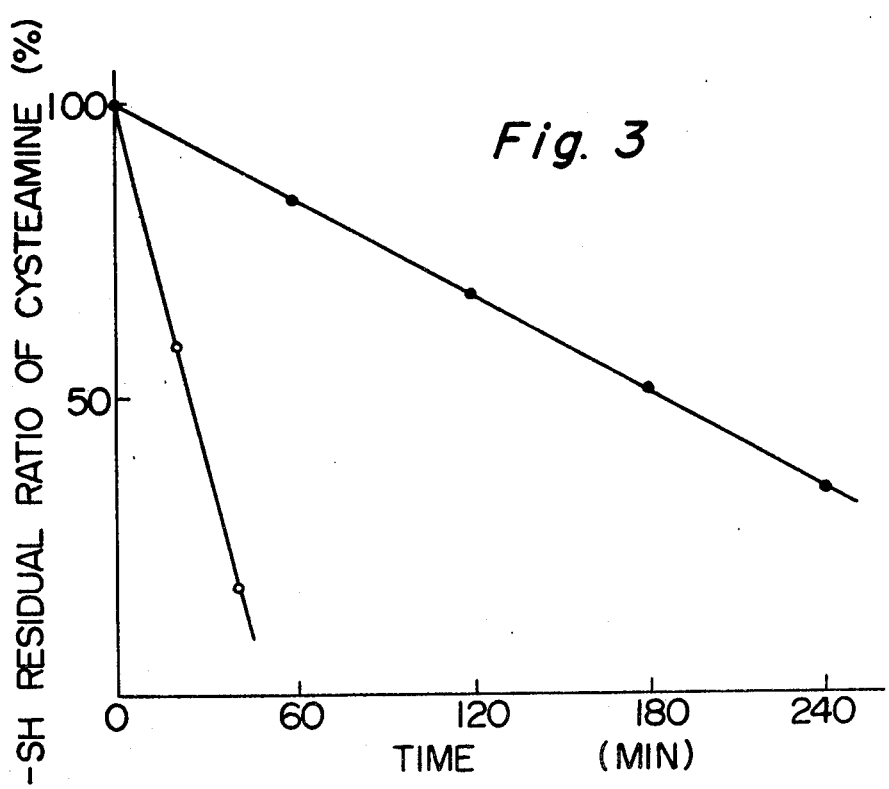
Figure 4:
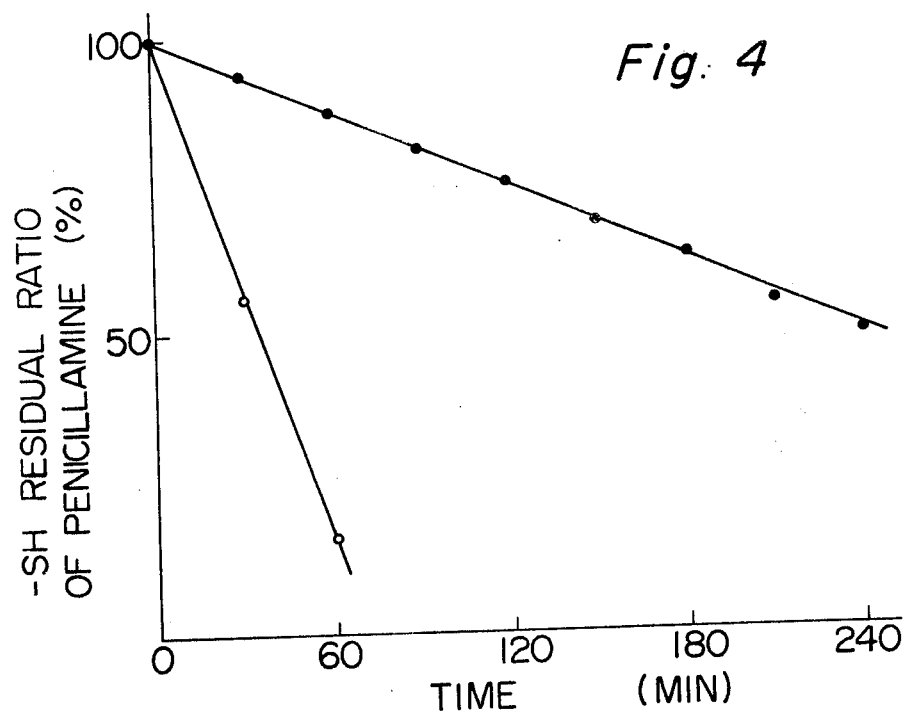
Figure 5:
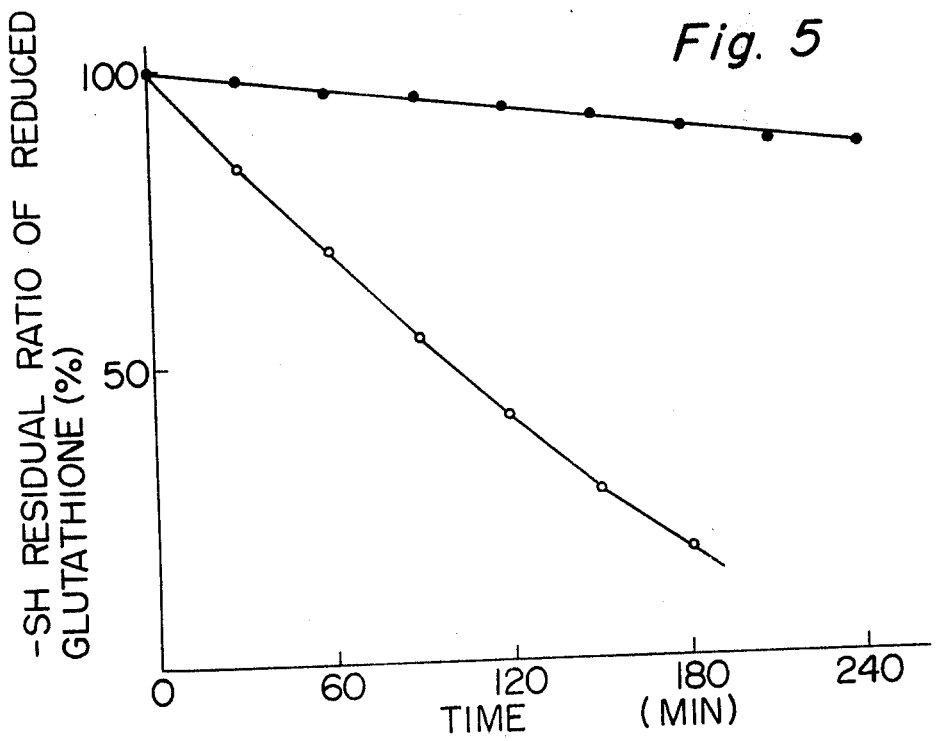

FIGS. 3 to 5 are graphic representations showing the rates of auot-oxidation of cysteamine (FIG. 3), penicillamine (FIG. 4) and reduced glutathion (FIG. 5) both in the presence and absence of the complex (reduced glutathione dextran complex) obtained in Example 1. In these Figures, the axis of abscissa represents the incubating time in minutes, and the axis of ordinates, the SH redidual ratio (%) of the above compounds. As is clear from a comparison of the residual ratio in the presence of the complex of this invention (indicated by -●-●-) with the residual ratio of the above SH-containing compound alone (indicated by -O-O-) the complex of this invention exhibits superior protecting or stabilizing action against the auto-oxidation of other compounds containing —SH group. In these experiments, there is hardly any auto-oxidation of the —SH group of the complex of this invention.

The above residual ratio is measured after dissolving the sample in a sodium phosphate buffer (0.1 m, pH 8.0) in the presence of copper sulfate ($5 \times 10^{-7}$ m), and incubating at 37° C. The SH content is measured by an amperometric silver titration.

In FIG. 3, the —SH residual ratio of cysteamine becomes zero in 60 minutes, whereas in the presence of the complex of this invention in a final concentration of $1 \times 10^{-3}$ M, the residual ratio is still maintained at about 85% after a lapse of 60 minutes. Even after a lapse of 120 minutes, the activity is still maintained at about 50%.

In FIG. 4, the activity of penicillamine decreases to about 15% in terms of the SH residual ratio in 60 minutes, whereas in the presence of the complex of this invention, the activity is still maintaind at about 90% after a lapse of 60 minutes. Even after 240 minutes, the activity is maintained at about 50%.

In FIG. 5, the activity of the reduced glutathione (final concentration $1 \times 10^{-3}$ M) decreases to about 20% in terms of the SH residual ratio in 180 minutes, whereas in the presence of the complex of this invention, the activity is still maintained at about 90%, and even after a lapse of 240 minutes, the residual ratio is maintained at as high as about 85%.

The above-mentioned marked improvement and increase in the activity or ability of reduced glutathione in the complex of this invention of a polysaccharide or its derivative with reduced glutathione and the highly stabilizing effect on the activity or ability of other compounds containing —SH groups are quite unexpected and surprising in view of the properties exhibited by the conventional complexes of biopolymers and polysaccharides.

Such properties of the complex of this invention are advantageous for example in using reduced glutathione for medical purposes in a liquid form such as an injecting preparation, because the reduced glutathione must be dissolved just prior to use and used before its activity is reduced. According to this invention, such an inconvenient restriction can be avoided. The effect of stabilizing the activity of other SH-containing compounds also suggests a synergistic effect of stabilizing other SH-containing compounds or of increasing the activity of these compounds. This effect can be utilized not only in medical uses, but in other fields.

Some examples of medical use of the complexes of this invention are given below.

Figure 2:
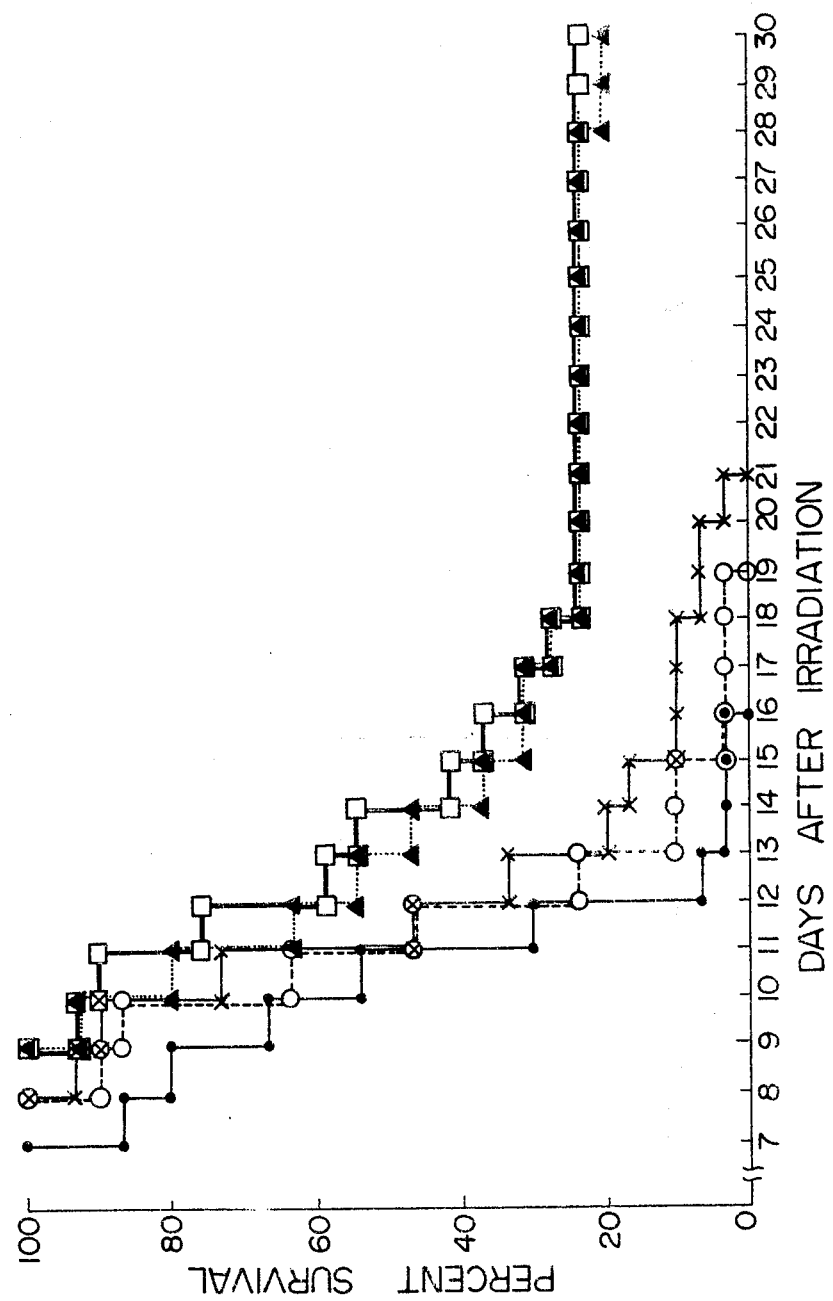

First, the protective activity of the complex of this invention against radiation damage was compared with that of reduced glutathione as follows:

ddY-type 8-week old male mice (30 in a group) were irradiated wholly with 160 KV X-rays (Cu 0.5 mm + Al 0.5 mm filter; a dosage rate 21.7 R/min.) in a total dosage of 650 R. On the other hand, the reduced glutathione dextran complex obtained in Example 1 was dissolved in 2 ml. of an isotonic sodium chloride solution. 60 or 120 minutes before the irradiation, the solution obtained had been administered intraperitoneally in a dosage of 25 mg (as glutathione) per mouse (two groups). On the other hand, reduced glutathione had been similarly administered immediately before the irradiation or 60 minutes before it (two groups). As a control, 2 ml. of only an isotonic sodium chloride solution had been administered intraperitoneally 60 minutes before irradiation (one group). With respect to these five groups, the effect of each of the compounds administered as evaluated by the rate of survival after a lapse of 30 days from the irradiation. The results are shown in FIG. 2.

liver was cut out, and its lipid and neutral fat were measured. The results are shown in Table 1.

Table 1

| Conditions for treating the rats | Liver wet Wt. (g) | Plasma GOT (Karmen U.) | Plasma GPT (Karmen U.) | Plasma glucose (mg/dl) | Plasma total bilirubin (mg/dl) | Total lipids (mg/g. wet liver) | Neutral fat (mg/g.wet liver) |
|---|---|---|---|---|---|---|---|
| Control group | 3.1±0.09 | 128±75 | 33±30 | 113±24 | 0.13 | 54±7 | 26±6 |
| Group to which D-GalN only was administered | 4.9±0.20 | 3515±1547 | 1792±822 | 59±12 | 0.32 | 165±19 | 127±17 |
| Group to which D-GalN was administered after G-SH administration | 4.8±0.08 | 1994±2016 | 898±918 | 82±16 | 0.33 | 167±24 | 129±19 |
| Group to which D-GalN was administered after G-D administration | 4.8±0.15 | 405±444 | 158±312 | 98±24 | 0.22 | 103±31 | 73±28 |

D-GalN : D-Galactosamine.HCl salt
G-SH : Reduced Glutathion
G-D : Reduced Glutathion Dextran complex In FIG. 2, the symbol □—□ refers to a group to which the reduced glutathione dextran complex was administered 60 minutes before X-ray irradiation; the symbol ▲—▲, to a group to which this complex was administered 120 minutes before X-ray irradiation; the symbol X—X, to a group to which the reduced glutathione was administered immediately before X-ray irradiation; the symbol ○--○, to a group to which the reduced glutathione was administered 60 minutes before X-ray irradiation; and the symbol ●—●, to the control group.

As shown in FIG. 2, the survival rate of rats after irradiation of X-rays is far greater in the group to which the complex of this invention was administered than the group to which the reduced glutathione was administered. It can be seen therefore that the reduced glutathione dextran complex of this invention can be used more effectively as reduced glutathione as a protective agent against radiation damage caused by radioactive rays including X-rays.

The prophylactic activity of the complex of this invention on a damage of liver was compared with that of reduced glutathione. The damage of liver was induced by administering D-galactosamine hydrochloride.

Wister female rats weighing 100 to 120 g (10 in a group) which had been fasted for 2 hours were used. Three groups were prepared. One group was administered intravenously with a solution obtained by dissolving 10 mg of reduced glutathione in 1 ml. of an isotonic sodium chloride solution. Another group was administered similarly with a solution of 160 mg of the reduced glutathione dextran complex (10 mg as reduced glutathione) obtained in Example 1 prepared in the same way as above. Still another group was administered only with 1 ml. of an isotonic sodium chloride solution. One hour after the administration, a solution obtained by dissolving 50 mg of D-glactosamine hydrochloride in 1 ml. of an isotonic sodium chloride solution and adjusting the pH of the solution to 7.0 with 0.1N sodium hydroxide was administered intraperitoneally.

After a lapse of 22 hours from the administration of D-galactosamine hydrochloride, blood was extracted from the abdominal aorta. GOT, GPT, bilirubin, and glucose in the plasma were measured. Furthermore, the As is clear from Table 1, in the group to which only D-galactosamine hydrochloride was administered, there is a marked increase in the plasma GOT, plasma GPT, plasma bilirubin and liver lipid and neutral fat and a decrease in the amount of plasma glucose owing to a damage of liver are observed. On the other hand, in the groups administered beforehand with reduced glutathione or the complex of reduced glutathione dextran, the tendencies of the increase or decrease are inhibited. It can be seen that the degree of inhibition is especially outstanding in the group administered with the complex of this invention of reduced glutathione and dextran as compared with the group administered with the reduced glutathione.

With regard to the inhibitory effect on the formation of a fatty liver in rats by ethionamide, the reduced glutathione dextran complex is far superior to the reduced glutathione. Accordingly, the reduced glutathione dextran complex of this invention can be expected to be used as an effective medicine against a damage of liver.

The complex of this invention is also useful as a waste water treating agent for removing heavy metals and/or aromatic halogen compounds from a waste water containing them by utilizing its improved and increased activity or ability ascribable to the —SH group. It is also useful as a treating agent for capturing and recovering heavy metals from a liquid containing the heavy metals.

The process for preparing the complex of this invention from polysaccharides or their derivatives and reduced glutathione is described below.

According to this invention, the complex can be obtained by reacting a polysaccharide or its derivative activated with an activating agent selected from the group consisting of cyanogen halides, organic cyanic acid esters and alkyl esters of halogenocarbonic acids. Especially good results can be obtained if this reaction is carried out under acidic conditions with a pH of less than 7. The use of polysaccharides or their derivatives activated with alkyl esters of halogenocarbonic acids is preferable to those activated with cyanogen halides or organic cyanic acid esters.

Examples of the activating agents are cyanogen halides or organic cyanic acid esters such as cyanogen bromide, cyanogen iodide, cyanogen chloride, phenyl cyanate, or 2,2,2-trichloroethyl cyanate, and lower alkyl esters (preferably $C_1$–$C_4$ lower alkyl esters) of chloro- or bromocarbonic acid such as methyl chlorocarbonate, ethyl chlorocarbonate or ethyl bromocarbonate.

Examples of the polysaccharides or their derivatives to be activated with the above activating agents include neutral polysaccharides such as dextran, starch, amylopectin, amylose, dextrin, cellulose, glycogen, inulin, mannan, laminaran or xylan; hydrogenated derivatives of these polysaccharides; hydroxyalkyl derivatives of these polysaccharides; carboxyalkyl derivatives of these polysaccharides; sulfated derivatives of these polysaccharides; and acidic polysaccharides such as chondroitin sulfate; carrageenan or agaropectin.

Examples of preferred hydrogenated derivatives are hydrogenated dextran, hydrogenated starch, hydrogenated amylose, hydrogenated amylopectin, hydrogenated dextrin, and hydrogenated glycogen. Examples of preferred hydroxyalkyl derivatives include hydroxyethyl starch, hydroxyethyl dextran, hydroxyethyl amylose, hydroxyethyl amylopectin, hydroxyethyl glycogen, hydroxyethyl mannan, hydroxymethyl dextran, hydroxypropyl dextran, hydroxymethyl starch, or hydroxypropyl starch (with the alkyl group containing 1 to 4 carbon atoms). Examples of preferred carboxyalkyl derivatives are carboxymethyl dextran, carboxymethyl cellulose, carboxymethyl starch, carboxymethyl amylose, carboxymethyl dextrin, carboxyethyl dextran or carboxyethyl cellulose (with the alkyl group containing 1 to 4 carbon atoms). Examples of preferred sulfated derivatives are dextran sulfate, amylopectin sulfate, amylose sulfate, starch sulfate, cellulose sulfate, inulin sulfate, mannan sulfate, laminaran sulfate or xylan sulfate.

Preferably, the degree of substitution of the hydroxyalkyl group, carboxyalkyl group or sulfuric acid group in the above derivatives ranges from about 0.05 to about 1.0 mol per structural saccharide unit of the polysaccharide. In the case of dextran, native dextrans and their partially hydrolyzed products having an intrinsic viscosity (measured in water at 25° C.) of about 1.5 to about 0.03 [dl/g] can be used.

The ratio of the activated polysaccharide or its derivative to the reduced glutathione to be reacted is not particularly restricted, but can be chosen as desired. Usually, the weight ratio of the polysaccharide or its derivative to the reduced glutathione is 1: about 0.05 to about 0.5.

The reaction can be carried out by stirring both of the starting materials in an aqueous medium at a pH of preferably les than 7, more preferably 6 ± 0.5 at a temperature of about 0° to about 40° C. for about 1 to 48 hours. When polysaccharides or their derivatives activated with the alkyl halogenocarbonates are used, the reaction is carried out preferably at a temperature of about 0° to about 25° C., more preferably less than 5° C., for about 1 to 24 hours.

The reaction can be performed in an aqueous medium, for example, in a 1M acetic acid buffer (pH 4.5–5.5), a 0.2 M sodium citrate buffer (pH 5.5–6.5) or a 0.2 M sodium phosphate buffer (pH 6.0–7.0).

The reaction product can be collected by precipitation from a water-miscible organic poor solvent for the product, such as aliphatic alcohols, or from a non-solvent for the product, such as acetone. By repeating a cycle of dissolving precipitate in water, for example, and re-precipitating it from a suitable amount of acetone, the precipitate can be purified. If desired, the purification can be performed by a gel filtration method. Where the reaction product is water-insoluble, it can be purified by filtration or centrigugal separation followed by thorough washing with water.

The resulting reduced glutathione complex of this invention can be dried by such means as drying in vacuo, spray drying or lyophylizing.

The activated polysaccharides or their derivatives used as starting compounds in the process of this invention can be prepared by various methods.

When they are activated with cyanogen halides or organic cyanates, the reaction can be carried out by adding such an activating agent to an aqueous solution or aqueous dispersion of a polysaccharide or its derivative, adjusting the pH of the reaction mixture to an alkaline side, preferably to about 9.5 to 11.5 by using a suitable alkaline substance such as sodium hydroxide or potassium hydroxide, and stirring the mixture for about 1 to about 60 minutes at a low temperature of about 0° to about 30° C. Preferably, the aqueous solution or dispersion of the polysaccharide or its derivative is treated beforehand with a weakly alkaline substance such as sodium carbonate or sodium bicarbonate to adjust its pH to about 7.0 to 9.0.

Where an alkyl halogenocarbonate is used as the activating agent, the reaction is carried out preferably in the presence of a tertiary amine using dimethyl sulfoxide as a liquid medium. Examples of other liquid media are pyridine, dioxane, tetrahydrofuran, toluene, chloroform, and ethylacetate. Examples of the tertiary amines are triethylamine and tri-n-butylamine.

Generally, the complex of a polysaccharide or its derivative with reduced glutathione is a solid powder assuming white to light yellow color. The reduced glutathione content of this complex can be suitably varied by changing such factors as the degree of activation of the activated polysaccharide or its derivative, or the concentration of the activated polysaccharide and/or reduced glutathione at the time of forming the complex. Usually, the reduced glutathione content is about 10 to about 200 mg/g when measured by determining the SH group content in accordance with an amperometric silver titration or determining the sulfur content in accordance with an oxygen combustion method. Complexes having a higher reduced glutathione content can be prepared by increasing the degree of activation which can be achieved by increasing the pH (but less than 7) and/or prolonging the reaction time in the activating reaction, or by increasing the concentrations of the activated polysacharide and/or reduced glutathione in the reaction of forming the complex.

The following Examples illustrate the present invention in greater detail.

EXAMPLE 1

Dextran (1 g) having an intrinsic viscosity, measured in water at 25° C., of 0.039 [dl/g] was dissolved in 10 ml. of a 0.1 M solution of sodium bicarbonate. Separately, 1 g of cyanogen bromide was dissolved in 30 ml. of distilled water with stirring while cooling the solution at 3° c. When the cyanogen bromide dissolved, the above dextran solution was poured into the cyanogen bromide solution with stirring. Then, the pH of the mixed solution was quickly adjusted to 11.0 by adding a 4N aqueous solution of sodium hydroxide. Stirring was continued for 8 minutes at 3° C. During this time, the pH of the reaction mixture was maintained at 10.9 to 11.1 using a 4N aqueous solution of sodium hydroxide. After the reaction, the reaction mixture was poured into 240 ml. of cold acetone with stirring. The resulting precipitate was collected, and 240 ml. of cold acetone was added in 4 portions to wash it. The resulting product was added to 40 ml. of a 0.2 M sodium phosphate buffer (pH 6.5) containing 100 mg of reduced glutathione, and the mixture was stirred at 25° C. for 18 hours. After the reaction, 240 ml. of cold acetone was added, and the resulting precipitate was collected by filtration on a glass filter. The product was dissolved in 4 ml. of 1M acetic acid, and filtered by gel filtration using a Sephadex G-25 column (using 1M acetic acid as a solvent). The ultraviolet absorption at 190 m$\mu$ of each of the fractions of the effluent was measured. Portions including the first peak were collected and lyophylized to afford 0.85 g of a light yellow powdery water-soluble product containing 70 mg/g of reduced glutathione. The residual activity of the reduced glutathione after 6 hours was 87%.

EXAMPLE 2

10 ml. of a 0.1 M sodium bicarbonate containing 1 g of dextran having an intrinsic viscosity, measured in water at 25° C, of 0.069 [dl/g] was mixed with 30 ml. of an aqueous solution containing 1.5 g of cyanogen iodide, and the mixed solution was reacted with stirring for 5 minutes at 3° C. while maintaining its pH at 10.9 to 11.1 using a 4N aqueous solution of sodium hydroxide. After the reaction, the reaction mixture was poured into 240 ml. of cold acetone with stirring. The precipitate formed was collected, and 240 ml. of acetone was added in 4 portions to wash the precipitate. The resulting product was added to 40 ml. of a 0.2M sodium phosphate buffer (pH 6.5) containing 100 mg of reduced glutathione, and the mixture was stirred for 18 hours at 25° C. After the reaction, 240 ml. of cold acetone was added to form a precipitate. The precipitate was washed with 240 ml. of acetone added in 4 portions, and dried in vacuo to afford 0.8 g of a white powdery water-soluble product containing 65 mg/g of reduced glutathione. The residual activity of reduced glutathione after 6 hours was 89%.

EXAMPLE 3

One gram of dextran having an intrinsic viscosity, measured in water at 25° C., of 0.176 [dl/g] was dissolved in 40 ml of a 0.1M aqueous solution of sodium bicarbonate, and 0.8 g of phenyl cyanate was added. The mixture was stirred at 3° C. for 4 minutes while maintaining its pH at 10.4 to 10.6 using a 4N aqueous solution of sodium hydroxide. Then, the same procedure as in Example 2 was repeated to afford 0.75 g of a white powdery water-soluble product containing 10 mg/g of reduced glutathione. The residual activity of reduced glutathione after 6 hours was 70%.

EXAMPLE 4

10 ml. of a 0.1M sodium bicarbonate solution containing 1 g of dextran having an intrinsic viscosity, measured in water at 25° C., of 0.176 [dl/g] was mixed with 30 ml. of an aqueous solution containing 1.0 g of cyanogen bromide. The mixture was stirred at 3° C. for 7 minutes while maintaining its pH to 10.4 to 10.6 using a 4N aqueous solution of sodium hydroxide. Then, the same procedure as in Example 2 was repeated to afford 0.8 g of a white powdery water-insoluble product containing 15 mg/g of reduced glutathione. The residual activity of reduced glutathione after 6 hours was 75%.

EXAMPLE 5

10 g of dextran having an intrinsic viscosity, measured in water at 25° C., of 0.039 [dl/g] was dissolved in 100 ml. of dimethyl sulfoxide, and 27 ml. of triethylamine and 16 ml. of dioxane were added. The mixture was cooled to below 5° C. While maintaining the reaction temperature at below 5° C., 10 ml. of ethyl chlorocarbonate was added dropwise to the mixture over the course of 2 minutes. Six minutes later, the reaction mixture was poured into 500 ml. of ethyl ether. The resulting precipitate was washed twice with 100 ml. of ethyl ether, and dissolved in 25 ml. of 90% ethanol. The ethanol-insoluble matter was removed by filtration. To the filtrate was then added 100 ml. of ether, and the precipitate was dried in vacuo to afford 10 g of dextran carbonate. One gram of the dextran carbonate was dissolved in 10 ml. of a 0.2M sodium phosphate buffer (pH 6.5), and 200 mg of reduced glutathione was added. While maintaining the pH at 6.5, the reaction was performed at room temperature for 7 hours. After adjusting the pH of the reaction mixture to 5.5, 60 ml. of methanol was added to the reaction mixture. The resulting precipitate was dissolved in 10 ml. of water, and 60 ml. of methanol was added to re-precipitate and purify the precipitate. It was then powdered using methanol, and dried in vacuo to afford 1 g of a white powdery water-soluble product containing 110 mg/g of reduced glutahtione. The residual activity of the reduced glutathione after 6 hours was 80%.

EXAMPLE 6

10 of hydroxyethyl starch having an intrinsic viscosity, measured in water at 25° C., of 0.14 [dl/g] (the degree of substitution of the hydroxyethyl group, 0.52 per anhydro glucose unit) was dissolved in 100 ml. of dimethyl sulfoxide, and 27 ml. of triethylamine and 16 ml. of dioxane were added. The mixture was cooled to below 5° C. While maintaining the reaction temperature at below 5° C., 10 ml. of ethyl chlorocarbonate was added to the mixture dropwise. Two minutes later, the reaction mixture was poured into 500 ml. of ethyl ether. The resulting precipitate was washed twice with 100 ml. of ethyl ether, and washed twice with 200 ml. of 90% ethanol. The resulting product was dehydrated with anhydrous ethanol and ether, and dried in vacuo to afford 9.0 g of hydroxyethyl starch carbonate.

One gram of the hydroxyethyl starch carbonate was dissolved in 20 ml. of a 0.2M sodium phosphate buffer (pH 6.5), and 200 mg of reduced glutathione was added. The reaction was performed at room temperature for 7 hours while maintaining the pH of the reaction system at 6.5. After the rection, the reaction mixture was separated, re-precipitated and purified in the same way as in Example 5 to afford 0.9 g of a white powdery water-soluble product containing 21 mg/g of reduced glutathione. The residual activity of the reduced glutatione after 6 hours was 72%.

EXAMPLE 7

10 ml. of a 0.1M aqueous solution of sodium bicarbonate containing 1 g of hydrogenated dextran prepared from dextran having an intrinsic viscosity, measured in water at 25° C., of 0.039 [dl/g] was mixed with 10 ml. of an aqueous solution containing 0.5 g of cyanogen bromide. The mixture was stirred at 3° C. for 13 minutes while maintaining its pH at 10.5 to 10.9 using a 4N aqueous solution of sodium hydroxide. Then, the same procedure as in Example 2 was repeated except that the amount of the reduced glutathione was charged to 200 mg and the amount of the 0.2M sodium phosphate buffer (pH 6.5) was changed to 10 ml. There was obtained 0.75 g of a white powdery water-soluble product containing 80 mg/g of reduced glutathione. The residual activity of the reduced glutathione after 6 hours was 88%.

EXAMPLE 8

20 ml. of a 0.1M aqueous solution of sodium bicarbonate containing 1 g of commercially available soluble starch was mixed with 20 ml. of an aqueous solution containing 1.0 g of cyanogen bromide. While maintaining the pH of the reaction system at 10.5 to 10.9 using a 4N aqueous solution of sodium hydroxide, the mixture was stirred at below 3° C. for 13 minutes. After the reaction, the reaction mixture was poured into 240 ml. of cold acetone with stirring. The resulting precipitate was collected, and washing with 240 ml. each of water and acetone added in 4 portions. The resulting product was reacted with 250 mg of reduced glutathione in the same way as in Example 2. After the reaction, the reaction mixture was subjected to centrifugal separation. The resulting precipitate was washed with 200 ml. each of water, 50% methanol and acetone, and dried in vacuo to afford 0.5 of a white powdery product containing 69 mg/g of reduced glutathione. The residual activity of the reduced glutathione after 6 hours was 88%.

EXAMPLE 9

10 ml. of a 0.1M aqueous solution of sodium bicarbonate containing 1 g of dextran sulfate having an intrinsic viscosity, measured in 1M sodium chloride solution at 25° C., of 0.027 [de/g] (the degree of substitution of the sulfate group 0.32 per anhydro glucose unit) was mixed with 20 ml. of an aqueous solution containing 1 g of cyanogen bromide, and the mixture was stirred at below 3° C. for 6 minutes while maintaining its pH at 10.9 to 11.1 using a 4N aqueous solution of sodium hydroxide. After the reaction, the same procedure as in Example 2 was repeated except that the amount of the 0.2M sodium phosphate buffer (pH 6.5) was changed to 10 ml. There was obtained 0.91 g of a white powdery water-soluble product containing 80 mg/g of reduced glutathione. The residual activity of the reduced glutathione after 6 hours was 92%.

EXAMPLE 10

10 ml. of a 0.1M aqueous solution of sodium bicarbonate containing carboxymethyl dextran sodium salt (the degree of substitution of the carboxymethyl group, 0.15 mol per anhydro glucose unit) having an intrinsic viscosity, measured in 1M sodium chloride solution, of 0.047 [de/g] was mixed with 20 ml. of an aqueous solution containing 1 g of cyanogen bromide, and the mixture was stirred at below 3° C. for 6 minutes while maintaining its pH at 10.9 to 11.1 using a 4N sodium hydroxide. After the reaction, the same procedure as in Example 8 was repeated to afford 0.6 g of a white powdery product containing 78 mg/g of reduced glutathione. The residual activity of the reduced glutathione after 6 hours was 80%.

EXAMPLE 11

The same procedure as in Example 5 was repeated using 10 g of hydroxyethyl dextran (the degree of the hydroxyethyl group 0.20 per anhydrous glucose unit) prepared from dextran having an intrinsic viscosity, measured in water at 25° C., of 0.039 [de/g] There was obtained 0.8 of a white powdery water-soluble product containing 100 mg/g of reduced glutathione. The residual activity of the reduced glutathione after 6 hours was 84%.

What we claim is:
1. A complex of a polysaccharide with reduced glutathione, said complex having an infrared absorption spectrum with no absorption peak at about 2500 cm$^{-1}$ which peak appears in the infrared absorption spectrum of said reduced glutathione;
   said polysaccharide being a member selected from the group consisting of dextran, hydrogenated dextran, hydroxyalkyl dextran, carboxyalkyl dextran and dextran sulfate.
2. The complex of claim 17 which has a residual ratio of its active SH group of at least 50% when it is incubated at 40° C. for 6 hours in a sodium phosphate buffer (0.1 M, pH 8.0) in the presence of FeCl$_3$ (1.2 × 10$^{-5}$M).
3. A pharmaceutical composition for protection against radiation damage, which comprises a complex of a polysaccharide with reduced glutathione, said complex having an infrared absorption spectrum without an absorption peak at about 2500 cm$^{-1}$, which peak appears in the infrared absorption spectrum of said reduced glutathione;
   said polysaccharide being a member selected from the group consisting of dextran, hydrogenated dextran, hydroxyalkyl dextran, carboxyalkyl dextran and dextran sulfate; and a pharmaceutically acceptable carrier or diluent;
   said complex being present in an amount effective to prevent radiation damage.
4. A pharmaceutical composition for protection against liver damage, which comprises a complex of a polysaccharide with reduced glutathione, said complex having an infrared absorption spectrum without an absorption peak at about 2500 cm$^{-1}$, which peak appears in the infrared absorption spectrum of said reduced glutathione;
   said polysaccharide being a member selected from the group consisting of dextran, hydrogenated dextran, hydroxyalkyl dextran, carboxyalkyl dextran and dextran sulfate; and a pharmaceutically acceptable carrier or diluent;
   said complex being present in an amount effective to prevent liver damage.

* * * * *